US012623693B2

(12) United States Patent (10) Patent No.: US 12,623,693 B2
Chang et al. (45) Date of Patent: May 12, 2026

(54) DETERMINING DYNAMIC ROUTE DATA

(71) Applicant: Zoox, Inc., Foster City, CA (US)

(72) Inventors: Yan Chang, Sunnyvale, CA (US);
Philip Charles Dasler, Foster City, CA
(US); Aaron Huang, San Francisco,
CA (US); Sutej Pramod Kulgod,
Foster City, CA (US); **Swapnil Vikas
Mankar, Union City, CA (US); Mark
Jonathon McClelland**, San Francisco,
CA (US); Arjun Sharma, Sunnyvale,
CA (US)

(73) Assignee: Zoox, Inc., Foster City, CA (US)

( * ) Notice: Subject to any disclaimer, the term of this
patent is extended or adjusted under 35
U.S.C. 154(b) by 151 days.

(21) Appl. No.: 18/622,094

(22) Filed: Mar. 29, 2024

(65) Prior Publication Data

US 2025/0304115 A1 Oct. 2, 2025

(51) Int. Cl.
B60W 60/00 (2020.01)
G01C 21/34 (2006.01)

(52) U.S. Cl.
CPC ..... B60W 60/0021 (2020.02); G01C 21/3415
(2013.01)

(58) Field of Classification Search
None
See application file for complete search history.

(56) References Cited

U.S. PATENT DOCUMENTS 10,649,459 B2 5/2020 Wang
11,105,651 B2 * 8/2021 Ichinokawa ......... G06V 20/588

2002/0053984 A1 5/2002 Yamashita et al.
2012/0191344 A1 7/2012 Iao et al.
2017/0370745 A1 * 12/2017 Woolley ................. G01C 21/36
2020/0232806 A1 * 7/2020 Goldman ............... G08G 1/167
2020/0400455 A1 12/2020 Wakayanagi et al.

FOREIGN PATENT DOCUMENTS

JP 2021004885 A 1/2021
WO WO2023062166 A2 4/2023

OTHER PUBLICATIONS

Machine translation of Fujita et al. (JP-2021004885-A) (Year:
2021).*
Search Report and Written Opinion for International Application
No. PCT/US2025/019983, Dated Jun. 25, 2025, 11 pages.

* cited by examiner

*Primary Examiner* — Navid Z. Mehdizadeh

*Assistant Examiner* — Sarah A. Mueller

(74) *Attorney, Agent, or Firm* — Lee & Hayes, P.C.

(57) ABSTRACT

Techniques for enabling dynamic routing are described
herein. A vehicle may receive a destination and generate a
path to the destination. Further, the vehicle may generate a
local graph that includes one or more driving lanes. The
vehicle may use the path and the local graph to determine
overlap data indicative of a distance that the path overlaps
with the driving lane(s). The vehicle may utilize the overlap
data to determine a color value(s) to associate with the
driving lane(s) in a top-down image. Accordingly, based on
determining the color value(s), the vehicle may generate
colored top-down image(s) of the driving lane(s) and use
such data to control the vehicle.

20 Claims, 8 Drawing Sheets

| DRIVING LANE | OVERLAP |
|---|---|
| 302 | 180M |
| 304 | 120M |
| 306 | 120M |
| 318 | 120M |

514

502

508

510

504

506

512

500

800 ⤵

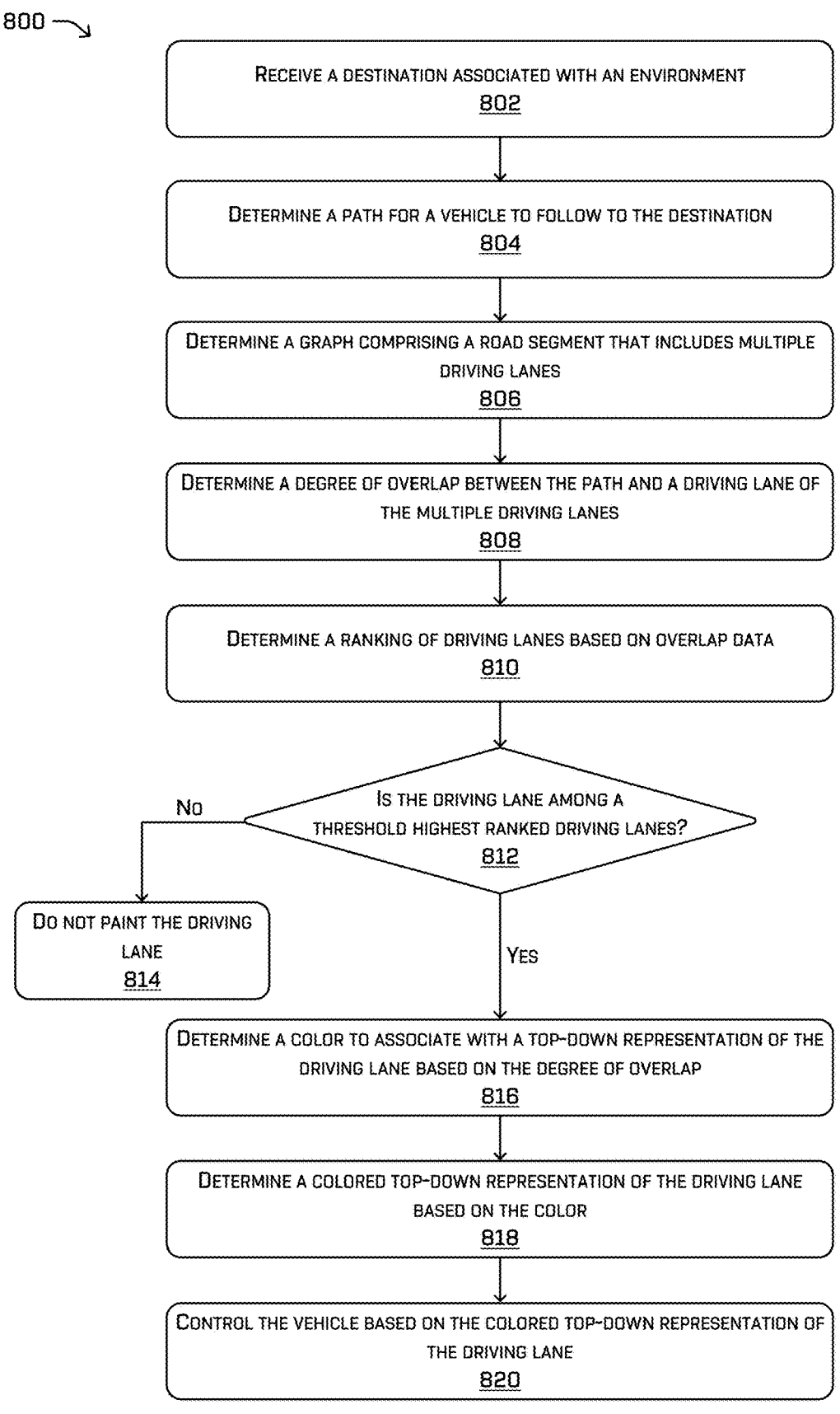

RECEIVE A DESTINATION ASSOCIATED WITH AN ENVIRONMENT
802

DETERMINE A PATH FOR A VEHICLE TO FOLLOW TO THE DESTINATION
804

DETERMINE A GRAPH COMPRISING A ROAD SEGMENT THAT INCLUDES MULTIPLE DRIVING LANES
806

DETERMINE A DEGREE OF OVERLAP BETWEEN THE PATH AND A DRIVING LANE OF THE MULTIPLE DRIVING LANES
808

DETERMINE A RANKING OF DRIVING LANES BASED ON OVERLAP DATA
810

IS THE DRIVING LANE AMONG A THRESHOLD HIGHEST RANKED DRIVING LANES?
812

No

DO NOT PAINT THE DRIVING LANE
814

YES

DETERMINE A COLOR TO ASSOCIATE WITH A TOP-DOWN REPRESENTATION OF THE DRIVING LANE BASED ON THE DEGREE OF OVERLAP
816

DETERMINE A COLORED TOP-DOWN REPRESENTATION OF THE DRIVING LANE BASED ON THE COLOR
818

CONTROL THE VEHICLE BASED ON THE COLORED TOP-DOWN REPRESENTATION OF THE DRIVING LANE
820

FIG. 8

DETERMINING DYNAMIC ROUTE DATA

BACKGROUND

Vehicles, such as autonomous vehicles, may navigate along a designated route. In some examples, autonomous vehicles may encounter various types of static and/or dynamic objects as well as traffic, construction zones, and the like. Upon detecting such occurrences, the vehicle may determine an updated route that leads the vehicle along different driving lanes and/or road segments that what was included in the original route. However, in certain circumstances, techniques for determining an updated route and/or controlling the vehicle based on the updated route may result in system failures or such systems outputting inaccurate or insufficient data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 is a flow diagram illustrating an example process for determining a path to a destination, determining a graph that includes a driving lane, determining an overlap between the path and the driving lane in the graph, determining a color based on the overlap, determining a colored top-down representation of the driving lane based on the color, and controlling the vehicle based on the colored top-down representation of the driving lane, in accordance with one or more examples of the disclosure.

DETAILED DESCRIPTION

Figure 1:
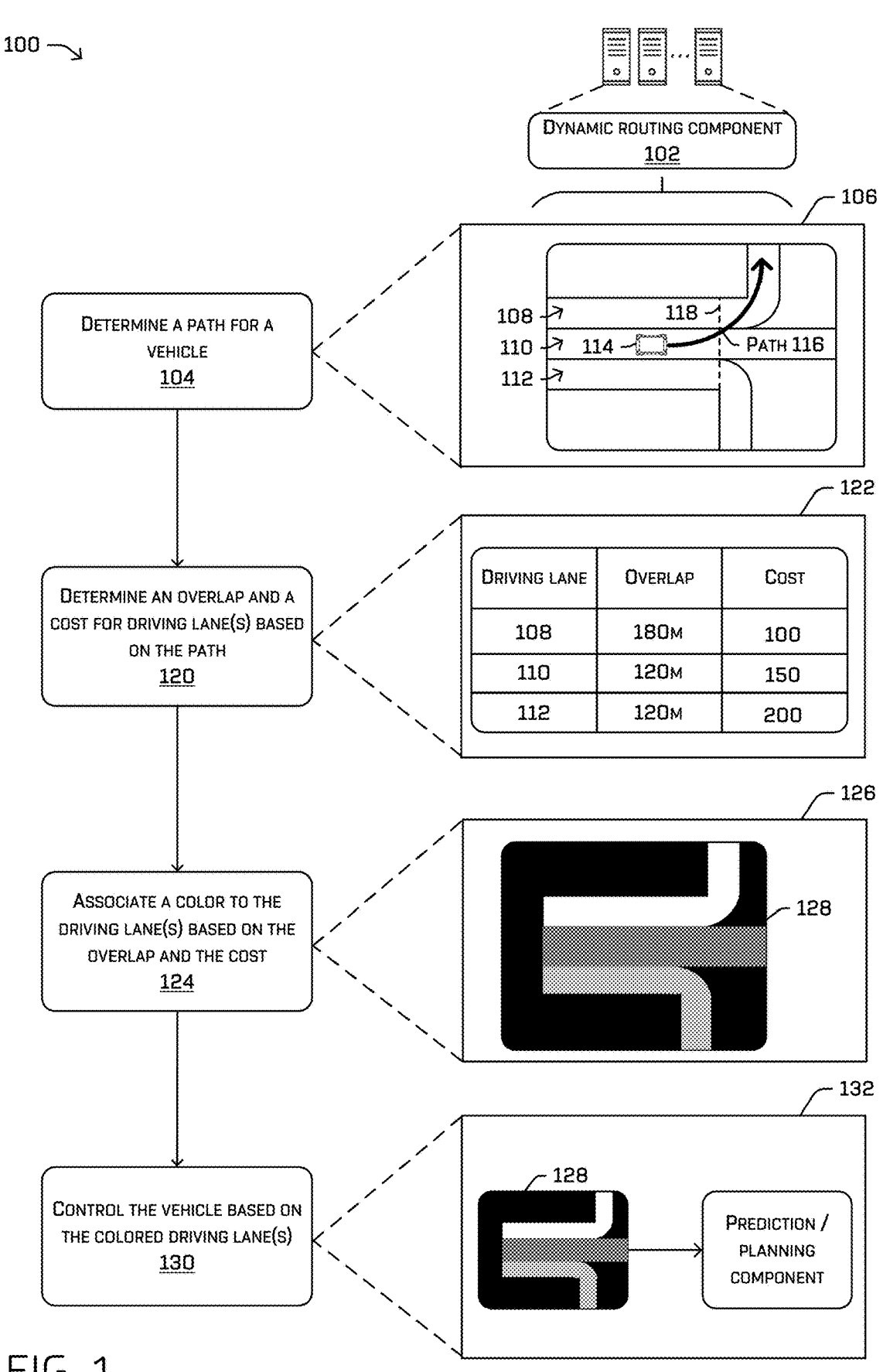
FIG. 1 is a pictorial flow diagram illustrating an example technique for determining and/or utilizing routing data, in accordance with one or more examples of the disclosure.

Techniques for generating vehicle routing data are described herein. As discussed below, colored top-down representation(s) of driving lanes and/or candidate routes may be used in prediction and/or planning systems to control a vehicle. In some examples, a vehicle (such as an autonomous vehicle) may receive a destination representing a location to which the vehicle is to navigate. The vehicle may generate a path (e.g., a spatial representation of a route to the destination, covers one or more laterally adjacent driving lanes, etc.) to the destination. Additionally, the vehicle may generate a local graph (e.g., extends a portion of the distance from the vehicle to the destination) that includes one or more driving lanes. Based on generating the path and the local graph, the vehicle may determine overlap data indicative of a distance that the path overlaps with the driving lane(s) in the local graph. The vehicle may utilize the overlap data to determine value(s) to associate with the driving lane(s) which may, throughout the disclosure, be represented and discusses as a "color." Accordingly, based on determining the color value(s), the vehicle may generate colored image(s) (which may, in some examples, include top-down perspective images) of the driving lane(s) and use such data to control the vehicle. As non-limiting examples, such images may be input into machine learned models to determine trajectories, perform reinforcement learning, determine costs (including learned costs), and the like for controlling a vehicle. As described in more detail below, the techniques described herein may improve vehicle safety and driving efficiency by enabling dynamic routing and increasing the ability to send the vehicle accurate representations of various candidate driving lanes and/or routes proximate the vehicle, thereby allowing the vehicle to perform safer and more efficient driving maneuvers.

When instructing a vehicle through an environment, it may be beneficial to ensure that vehicle systems can receive, process, and/or output data consistent with dynamic routing. For example, systems of a vehicle may determine routing information when the vehicle starts navigating to a destination. The routing information may include a single, fixed route (e.g., high level representation of the road network) that the vehicle is to follow and extends from the current location of the vehicle to the destination. However, in some cases, the vehicle may determine that the fixed route may be suboptimal and/or inefficient. In such instances, the vehicle may attempt to generate updated route(s) (e.g., dynamic routing) and send those route(s) to downstream processes for further processing. However, in some circumstances, vehicle systems may be built or otherwise constructed to receive, process, and/or output data consistent with the single fixed route determined prior to starting the mission. For instances, certain prediction and/or planning models may be designed to receive and/or process a single, fixed route and may fail to operate properly unless provided such. Accordingly, inputting multiple routes into these vehicle systems may result in the systems failing or the systems outputting inaccurate data. As such, the systems and/or techniques described herein may enable vehicle systems to receive and/or output dynamic route inputs.

To address these and other technical problems and inefficiencies, the systems and/or techniques described herein include a dynamic routing component (which also may be referred to as a "dynamic routing system") configured to enable dynamic routing by generating representations of the environment that are capable of being processed by downstream vehicle systems. Technical solutions discussed herein solve one or more technical problems associated with conventional dynamic routing techniques resulting in suboptimal system output(s).

In some examples, the dynamic routing component may receive a destination associated with a region of the environment. The vehicle may receive instruction(s) (e.g., transport passenger(s), deliver item(s), etc.) to navigate from a starting location to an ending location (or destination). Such instruction(s) may be received from a fleet management system, a remote operating system, a passenger or a passenger device, a future passenger, and/or any other source. In some examples, a destination may be a location within the environment to which the vehicle is to navigate. That is, the instructions may include a location (e.g., x-y coordinate) within the environment associated with a destination.

In some examples, the dynamic routing component may determine a path for the vehicle to follow to the destination. A path may be a spatial representation of potential movements of the vehicle. Further, the path may laterally span some or all driving lanes within a road segment (e.g., multiple driving lanes of the same length traveling in the same direction). In some examples, the dynamic routing component may determine the path by identifying the optimal path from the position of the vehicle to the destination. For instance, the dynamic routing component may receive map data representing the environment between the vehicle and the destination and identify the shortest path from the vehicle to the destination. Such operations may be performed using one or more shortest path algorithms such as Dijkstra's Algorithm, A*, D*, etc. Accordingly, upon performing the shortest path algorithm, the dynamic routing component may receive, determine, or otherwise identify a single path representing the shortest distance to the destination.

In some examples, the dynamic routing component may determine a local graph based on the starting location of the vehicle and the destination. A local graph may be a graph or map that represents the road segments (e.g., one or more driving lanes of equal length associated with a same direction of travel), driving lane(s), and/or lane segment(s) (e.g., longitudinal sections of a driving lane) of the physical environment spanning or otherwise covering a smaller portion of the physical environment than that of the entire distance to the destination, while also extending beyond the distance covered by candidate trajectories. That is, the local graph may cover a larger distance from the vehicle than the distance covered by the candidate trajectories. The region of the physical environment covered by the local graph may define a local search horizon corresponding to the local graph. The local search horizon may be the region within which the dynamic routing component may evaluate when determining the representations of driving lanes. The dynamic routing component may generate the local graph based on map data, such as road network data, lane segment data (e.g., lane segment dimension, location, shape, type, etc.), and/or any other type of data.

In some examples, the dynamic routing component may generate and/or update the local graph while the vehicle traverses to the destination. The dynamic routing component may generate a first instance of the local graph during the vehicle startup phase. Further, the dynamic routing component may update the local graph while the vehicle traverses the environment according to an operating tick of the planner component. An operating tick may be a frequency (e.g., 1 millisecond, 5 milliseconds, etc.) and/or duration of a processing cycle within the planning component. As such, in some examples, the dynamic routing component may update the local graph at each operating tick. However, in other examples, the local graph may be updated at any other suitable frequency (e.g., every N number of ticks, where N is an integer greater than zero, based on movement of the vehicle, velocity of the vehicle, number of additional objects proximate the vehicle, difficulty of maneuvers, proximity to the endpoint, etc.). As such, an updated local graph may span a different region of the environment than a previous version of the local graph based on the movement of the vehicle. In some examples, the dynamic routing component may generate the local graph(s) based on map data and/or by modifying the local graph from the previous tick; however, in other examples, the dynamic routing component may generate a local graph separate from previous local graphs.

As described in more detail below, the dynamic routing component may use the path and the local graph to determine overlap data and/or cost value(s) associated with the driving lane(s) (or lane segments) within the local graph. In such cases, the dynamic routing component may use the overlap data and/or the cost value(s) to determine which of the driving lane(s) within the local graph are relevant to the vehicle and generate colored top-down images of the relevant driving lane(s).

In some examples, the dynamic routing component may determine a degree of overlap between the path and the driving lane(s) (or the lane segment(s)) in the local graph. An overlap represents how much a given driving lane (or lane segment) spatially overlaps with the path. Specifically, the overlap may be a distance-based measurement that measures the distance the path overlaps with the driving lane starting from the current location of the vehicle. For example, a vehicle may be located on a road segment that includes two laterally adjacent driving lanes. In this example, the first driving lane may turn right in 75 meters from the vehicle while the second driving lane continues straight to the border of the local graph. As such, since the path laterally spans both driving lanes, the dynamic routing component may determine a first degree of longitudinal overlap with the first driving lane and a second degree of longitudinal overlap with the second driving lane. In this example, the path may continue straight to the border of the local graph. Accordingly, the degree of overlap for the first driving lane may be 75 meters since the path overlaps with the first driving lane until the point at which the first driving lane turns right. Further, the degree of overlap for the second driving lane may be 250 meters (e.g., the distance to the border of the local graph) since the path overlaps with the second driving lane through the local search horizon. Of course, in other examples the local search horizon may be larger or smaller which may result in the degree of overlap for the second driving lane being larger or smaller.

In some examples, the dynamic routing component may modify or update the degree of overlap to account for the location of the vehicle in the driving lane. That is, the dynamic routing component may subtract the distance from the start of the driving lane to the vehicle position from the overall overlap distance. For example, the dynamic routing component may determine that the driving lane is 90 meters long and the vehicle is located 30 meters into the driving lane (e.g., from the start of the driving lane to the vehicle location is 30 meters). As such, if the path overlaps with a driving lane until the end of the driving lane, the degree of overlap may be 90 meters. However, in such cases, the dynamic routing component may subtract the vehicle position (e.g., 30 meters) from the degree of overlap (e.g., 90 meters) which may result in an updated degree of overlap of 60 meters.

In some examples, the dynamic routing component may update the overlap data as the vehicle moves in the environment. As the vehicle moves throughout an environment, additional (or new) driving lanes may appear in the local graph which were not present in a previous instance of the local graph. Accordingly, the dynamic routing component may update the degree of overlap for the driving lanes (e.g., driving lanes new to the local graph, driving lanes previously within the local graph, etc.) within some or all new instances of the local graph.

In some examples, the dynamic routing component may determine a cost representative of following a driving lane to the destination. The cost may be a time-based cost that considers the time it takes to reach the destination. For example, the dynamic routing component may determine the cost for a specific driving lane by a combination of the speed limit of the driving lane and the distance to the destination following the driving lane (e.g., the distance may be determined using Dijkstra's Algorithm). In other examples, the cost may be modified based on the number and/or type (e.g., required, optional, etc.) of lane changes associated with following the driving lane. For example, the dynamic routing component may increase the cost based on the driving lane requiring a high number of required lane changes to arrive at the destination. Further, in other examples, the cost may be based on risk data, predicted collisions, etc. Of course, this is not intended to be limiting; in other examples, the cost may be based on the speed limit and the distance excluding the number and/or type of lane changes.

In some examples, the dynamic routing component may identify relevant driving lane(s) from the local graph based on the overlap data and/or the cost value(s). That is, when generating the colored top-down image(s), the dynamic routing component may determine that the relevant driving lanes are to be included in the images. As such, the dynamic routing component may identify the relevant driving lane(s) by ranking the driving lanes based on the overlap data associated with the driving lanes. That is, the driving lanes may be ranked with the highest rank corresponding to the driving lane with the highest degree of overlap and the lowest rank corresponding to the driving lane with the lowest degree of overlap. Based on ranking the driving lanes according to overlap data, the dynamic routing component may select (or determine) the N top (or highest ranked) driving lanes. That is, the dynamic routing component may determine a threshold number of driving lanes and select the driving lanes that meet or exceed the threshold. However, in instances in which multiple driving lanes have the same degree of overlap, the dynamic routing component may rank such driving lanes (e.g., the driving lanes with the same degree of overlap) based on the cost values associated with such driving lanes. In such cases, the dynamic routing component may select a threshold number of the most optimal (or highest ranked) driving lanes according to the cost. Alternatively or additionally, if the dynamic routing component determines that the total number of driving lanes in the local graph is less than the threshold number of driving lanes, the dynamic routing component may select all of the driving lanes. The dynamic routing component may determine that the selected driving lanes may be the relevant driving lanes to the vehicle.

In some examples, the dynamic routing component may generate representation(s) (e.g., colored top-down representation(s)) of the relevant driving lanes. That is, the dynamic routing component may generate one or more images (e.g., representations, top-down representations, etc.) that include some or all of the driving lanes which may be sent to various downstream systems and/or machine-learning models trained to determine actions for the vehicle to follow. As discussed below, the dynamic routing component may generate the image(s) according to one or more techniques. The first technique may include generating multiple, independent colored top-down images that each corresponding to a specific driving lane. The second technique may include generating a single colored top-down image that includes some or all the (relevant) driving lanes. The third technique may include generating multiple independent colored top-down images that each include some or all of the (relevant) driving lanes and each image corresponds to a specific type of metric. However, this is not intended to be limiting; in other examples, there may be more or fewer techniques and/or the dynamic routing component can use any combination of the three techniques described.

Based on the first technique, the dynamic routing component may generate multiple colored top-down images that each correspond to a specific driving lane. In some examples, the dynamic routing component may determine a value (or color) to associate with each of the relevant driving lanes. That is, the dynamic routing component may determine a color to paint the specific driving lane. The dynamic routing component may determine the value (or color) by determining an overall score that is the combination of one or more sub-scores. Further, the overall score may be a value between 0 and 1 that maps to a color value which may be used to paint the driving lane in the colored top-down image. In some examples, the dynamic routing component may determine the overall score based on determining one or more sub-scores. The sub-scores may correspond to one or more types of metrics. For example, the dynamic routing component may determine a first sub-score based on a first type of metric that is based on how far the vehicle is from the destination (e.g., penalize the score the further the vehicle is away from the destination). That is, the first sub-score may be a value that scales (linearly) from 0.5 (or any other number) at the location of the vehicle to 1 (or any other number) to the destination. The second sub-score may be based on a second type of metric that is based on the number and/or types (e.g., optional, required, etc.) of lane changes associated with following the driving lane to the destination (e.g., penalize staying in a when a lane change is required, encourage lane changes into target lanes, etc.). That is, the second sub-score may be a 0 if the driving lane does not lead to the destination and/or does not include adjacent lanes that lead to the destination. Additionally, the second sub-score may be 1 (or any other non-zero number) if the driving lane leads to the destination. The third sub-score based on a third type of metric that is distance-based and scaled starting from the location of the vehicle to a predetermined distance (e.g., destination, boundary of local graph, etc.). That is, the third sub-score may be a value that scales from 0 at the location of the vehicle to 0.25 (or any other number) to a predetermined location. The fourth sub-score based on a third type of metric that weights the current driving lane using the cost values (e.g., fourth sub-score=$\alpha*(C_{max}-C_{min})/(C_{max}-C_{min})$) discussed above. The $C_{max}$ may be the maximum cost of the multiple costs associated with the relevant driving lanes and the $C_{min}$ may be the minimum cost of the multiple costs associated with the relevant driving lanes.

Based on determining the sub-scores for the four types of metrics, the dynamic routing component may use the sub-scores to determine a value to associated with the driving lane and/or a color to paint the driving lane (or the pixels associated thereto). The dynamic routing component may determine the value and/or color using the following equation:

$$Color=T1*(T2+T3+T4) \qquad \text{Equation 1}$$

In this equation, Color may represent the overall score that may be mapped to a specific color value. T1 may represent the first sub-score described above, T2 may represent the first sub-score described above, T3 may represent the first sub-score described above, and T4 may represent the first sub-score described above. In some examples, based on determining the color associated with the driving lane, the dynamic routing component may paint the color value on the pixels associated with the driving lane in the top-down image. That is, the dynamic routing component may generate a different, independent top-down image (or representation) for each of the relevant driving lanes. For example, the dynamic routing component may generate T1-T4 scores for a first driving lane, determine a color based on such values, generate a colored top-down image that includes the driving lane, and re-perform such operations for the remaining driving lanes. Accordingly, if there are four relevant driving lanes, the dynamic routing component may generate the T1-T4 scores four times (e.g., once for each lane), determine four different color values (e.g., a unique color for each driving lane), and generate four different, independent colored top-down images (e.g., each colored top-down image including the single driving lane associated thereto).

Based on the second technique, the dynamic routing component may generate a single colored top-down image that includes some or all of the (relevant) driving lanes. That is, the dynamic routing component may paint some or all of the relevant driving lanes within a single top-down image. In some examples, the dynamic routing component may perform similar operations as described above with respect to determining T1-T4 scores for each of the relevant driving lanes. However, instead of generating multiple independent colored top-down images with each image including a single driving lane, the dynamic routing component may combine each of the relevant driving lanes into a single top-down image. Accordingly, since there may be multiple driving lanes in the same top-down image, the dynamic routing component may determine a color to paint each pixel in the image using the following formula:

$$\text{Paint}_{final}(x,y)=\max(\text{paint}_1(x,y),\text{paint}_2(x,y),\ldots,$$
$$\text{paint}_n(x,y)) \quad\quad \text{Equation 2}$$

In this equation, $\text{Paint}_{final}(x,y)$ may represent the color value (or a value that maps to the color value) that may be used to paint the pixel in the top-down image. The $\text{paint}_i(x, y)$ may represent the color value determined from Equation 1 for the ith driving lane. That is, the dynamic routing component may perform the operations described above with respect to Equation 1 for each of the relevant driving lanes and input the results into Equation 2 which may indicate the final color value to paint the associated pixel (e.g., x-y coordinate in the image frame).

Based on the third technique, the dynamic routing component may generate multiple, independent colored top-down images with each image including some or all of the (relevant) driving lanes and each image corresponding one of T1-T4 described above. That is, the dynamic routing component may determine four colored top-down images, the first image corresponding to T1 and the first type of metric, the second image corresponding to T2 and the second type of metric, the third image corresponding to T3 and the third type of metric, and the fourth image corresponding to T4 and the fourth type of metric. For the third technique, the dynamic routing component may determine T4 by following the following formula, $T4=\alpha*(C_{max}-C_{min})/(C_{max}-C_{min}+\beta))$ where $\beta$ is a constant that weights the driving lanes with the $C_{max}$. In this example, if there are four relevant driving lanes, each of the four top-down images may include the four of the driving lanes. The dynamic routing component may determine a unique color for each pixel within the image based on the T1-T4 scores. That is, the dynamic routing component may determine T1-T4 scores for each of the relevant driving lanes. For example, if there are four driving lanes, the dynamic routing component may determine T1-T4 scores for the first driving lane, T1-T4 scores for the second driving lane, T1-T4 scores for the third driving lane, and T1-T4 scores for the fourth driving lane. Based on determining such scores for each of the relevant driving lanes, the dynamic routing component may input the scores into Equation 2 to determine the color value to paint the associated pixel. In some instances, if the dynamic routing component is painting the color values of the first colored top-down image that corresponds to the first metric (e.g., T1), the dynamic routing component may input the T1 scores for each of the four driving lanes into Equation 2 and the use the result as the color to paint the associated pixel. Further, if the dynamic routing component is painting the color values of the second colored top-down image that corresponds to the second metric (e.g., T2), the dynamic routing component may input the T2 scores for each of the four driving lanes into Equation 2 and the use the result as the color to paint the associated pixel. The dynamic routing component may perform such operations when painting the driving lanes within each of the four colored top-down images.

In some examples, based on generating the colored top-down image(s) according to the first, second, and/or third techniques, the dynamic routing component May send the colored top-down image(s) to downstream prediction and/or planning systems. Such systems may use the colored top-down image(s) to predict object movements and/or determining future actions for the vehicle to follow throughout the environment. Accordingly, the systems may control the vehicle based on the colored top-down image(s).

Additionally or alternatively, the dynamic routing component may use the data associated with the driving lanes and/or Equations 1 and/or 2 in a vector representation. That is, the dynamic routing component may perform the operations to obtain the data described above and store such data as a vector representation in map data. In some examples, map data can be represented as vectors and/or polylines (e.g., rather than rasterized in a top-down form). In such examples, the techniques can be used and a value (or color) can be associated with individual vectors, sub-vectors, and/or groups of vectors. Such data may be used by predication and/or planning systems.

Although the techniques above are discussed in the context of color, such techniques are not so limited. The dynamic routing component may generate channel data and/or determine a number that can be associated with a portion of the driving lane. The number may map to a color value, but the number does not need to be represented by a color by the dynamic routing component and/or any other component.

The techniques described herein can improve the functioning, safety, and efficiency of the autonomous and semi-autonomous vehicles operating in various environments. Generating colored top-down images associated with the one or more driving lanes proximate the vehicle may increase the ability of downstream systems to process the various driving lanes and the data associated thereto. Further, such techniques allow the vehicle to perform dynamic routing techniques since the systems described herein may be capable of receiving data associated with the plurality of candidate driving lanes and/or routes. The ability of the vehicle to perform dynamic routing may allow the vehicle to perform safer and/or more efficient driving maneuvers.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for determining and/or utilizing dynamic routing data. As shown in this example, some or all of the operations in the example process 100 may be performed by a perception component, prediction component, a planning component, and/or any other component or systems within an autonomous vehicle. For instance, as shown in this example, example process 100 may be implemented using a dynamic routing component 102. As described below in more detail, the dynamic routing component 102 may include various components, such as a path determining component, a graph generating component, an overlap determining component, a cost determining component, and/or a painting component.

At operation 104, the dynamic routing component 102 may determine a path (or shortest path) for a vehicle to follow. In some examples, the dynamic routing component 102 may receive instruction(s) that include a coordinate in the environment representing a destination to which the vehicle is to navigate. In such cases, the dynamic routing component 102 may use Dijkstra's Algorithm (or any other shortest path technique) to identify the shortest path from the vehicle to the destination. The result of performing the shortest path operation may be a path from the vehicle location to the destination. For example, box 106 illustrates a path leading to a destination. In this example, box 106 may include multiple driving lanes. Specifically, the box 106 may include a driving lane 108, a driving lane 110, and a driving lane 112. As shown, the three driving lanes may be laterally adjacent to one another and may each belong to (or be otherwise associated with) the same road segment. As shown, the driving lane 108 may include a left turn, the driving lane 110 may continue straight, and the driving lane 112 may include a right turn. However, this is not intended to be limiting; in other examples there may be more or fewer driving lanes and such driving lanes may include similar or different road shapes.

As shown, box 106 may include a vehicle 114 that may be navigating from a starting location to an ending location. In this example, upon receiving the destination location, the dynamic routing component 102 may generate a path 116 for the vehicle 114 to follow to the destination. As indicated above, the path 116 may be a spatial representation of the route the vehicle 114 may follow to the destination. Further, though box 106 illustrates the path 116 as being within driving lane 110 and then transitioning to driving lane 112, the path 116 may span the entire road segment. That is, the path 116 may span all of the laterally adjacent lanes within the road segment (e.g., multiple driving lanes of the same length traveling in the same direction) until the path reaches the end of the road segment which may be represented by the dashed line 118. Specifically, the path 116 may span (or overlap with) all three driving lanes until the path 116 reaches the end of the road segment as noted by the dashed line 118. Accordingly, upon reaching the dashed line 118, the path 116 may span all of the laterally adjacent driving lanes in the next road segment. In this example, the next road segment consists of the driving lane 108 which may be the single driving lane in the road segment. As shown in box 106, the path 116 may turn left along the driving lane 108.

At operation 120, the dynamic routing component 102 may determine an overlap and a cost for driving lane(s) based on the path 116. The dynamic routing component 102 may use the overlap data and/or the cost data to determine or otherwise identify relevant driving lane(s) for the vehicle. Based on identifying the relevant driving lane(s), the dynamic routing component 102 may generate one or more colored top-down images of such driving lane(s). The dynamic routing component 102 may determine the overlap values by determining the distance that the path 116 overlaps with the driving lane. For example, the degree of overlap for the driving lane 108 may be based on the distance the path 116 overlaps with the driving lane 108. The dynamic routing component 102 may perform such distance measuring operations for each of the driving lane(s). For example, box 122 illustrates overlap data and/or cost data for the various driving lane(s). In this example, box 122 illustrates that the degree of overlap for the driving lane 108 may be 180 meters based on the path 116 following the lane beyond the dashed line 118 (e.g., end of the road segment), the degree of overlap for the driving lane 110 may be 120 meters based on the path 116 not continuing straight beyond the dashed line 118, and the degree of overlap for the driving lane 112 may be 120 meters based on the path 116 not continuing straight beyond the dashed line 118.

As shown, the dynamic routing component 102 may also determine cost value(s) associated with each of the driving lane(s). The cost value for a driving lane may be determined based on a combination of a speed limit of the driving lane, a distance (e.g., obtained using Dijkstra's Algorithm) to the destination following the driving lane, and/or a number and/or type of lane change associated with following the driving lane. The box 122 illustrates that the cost associated with following the driving lane 108 to the destination may be 100, the cost associated with following the driving lane 110 to the destination may be 150, and the cost associated with following the driving lane 112 to the destination may be 200.

At operation 124, the dynamic routing component 102 may associate a value (which may map to a color value) to the driving lane(s) based on the overlap data and/or the cost value(s). As indicated above, the dynamic routing component 102 may use the overlap data and/or the cost value(s) to identify relevant driving lane(s) for the vehicle 114. Additional description regarding identifying relevant driving lane(s) is described throughout the application and in FIG. 2. In this case, driving lane 108, driving lane 110, and the driving lane 112 may be considered relevant driving lanes. Accordingly, the dynamic routing component 102 may generate one or more colored top-down images that include one or more of the driving lanes. That is, the dynamic routing component 102 may generate the image(s) (e.g., colored top-down representation(s)) according to the first, second, and/or third techniques described above. In FIG. 1, the dynamic routing component 102 may perform the operations of the second technique by generating a single colored top-down image that includes all of the relevant driving lanes. Additional description of the first technique may be discussed in FIGS. 2 and 4 and additional description of the third technique may be discussed in FIGS. 2 and 6.

As shown in box 126, the dynamic routing component 102 may generate a single image 128 that includes the driving lane 108, the driving lane 110, and the driving lane 112. In this example, the dynamic routing component 102 may determine what color to paint the driving lanes (and/or the associated pixels) by using Equations 1 and/or 2 described above. To use such equations, the dynamic routing component 102 may determine one or more sub-scores (e.g., T1-T4) and input such scores into the equations. The dynamic routing component 102 may determine the sub-scores by determining T1 based on a distance from the vehicle to the destination following the specific driving lane, T2 based on the number and/or types of lanes changes associated with following a driving lane, T3 based on scaled distance from the vehicle to a predefined distance, and T4 based on weighting the cost values as described above. Based on determining such values, the dynamic routing component may input the scores into Equations 1 and/or 2. The result(s) of such equations may be a value that maps to a color value which may then be used to paint the pixel and/or driving lane. As show, the driving lane 108 may be painted in a white color value, the driving lane 110 may be painted in a dark grey color value, and the driving lane 108 may be painted in a light grey color value.

At operation 130, the dynamic routing component 102 may control the vehicle based on the colored driving lane(s). In some examples, the dynamic routing component 102 may send the image 128 to downstream prediction and/or planning components for further processing. For example, box 132 illustrates sending the image 128 to a prediction and/or planning component. In such cases, the prediction and/or planning systems may use the image 128 to control the actions of the vehicle 114.

Figure 2:
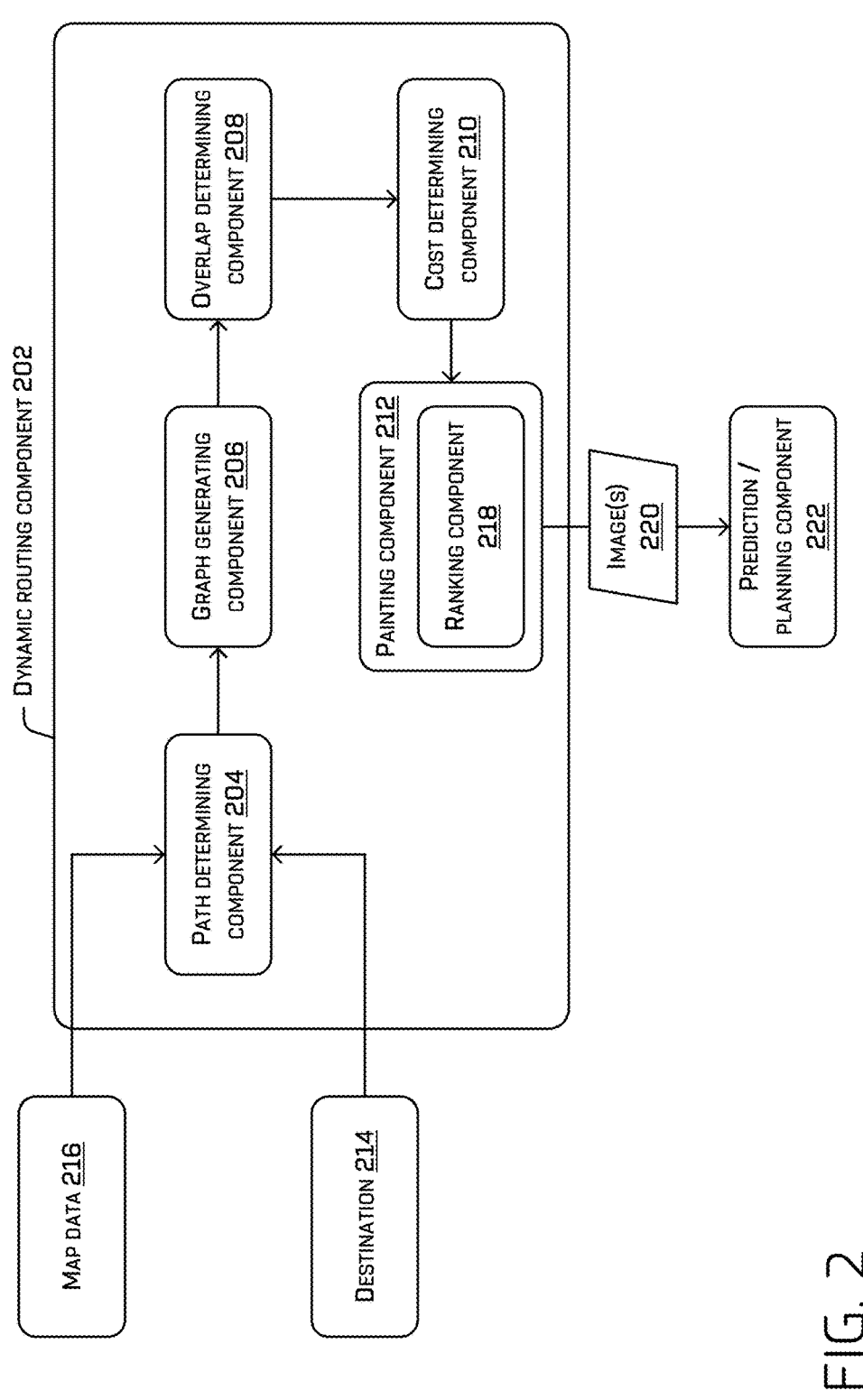
FIG. 2 illustrates an example computing system including a dynamic routing component configured to generate colored top-down representation(s) of candidate routes which may be used to control a vehicle, in accordance with one or more examples of the disclosure.

FIG. 2 illustrates an example computing system 200 including a dynamic routing component 202 configured to generate colored top-down representations of candidate routes which maya be used to control a vehicle.

In some examples, the dynamic routing component 202 may be similar or identical to the dynamic routing component 102 described above, or in any other examples herein. As noted above, in some cases the dynamic routing component 202 may be implemented within an autonomous vehicle. In some examples, the dynamic routing component 202 may include various components, described below, configured to perform different functionalities of a technique to generate colored top-down representation(s) of driving lane(s). In some examples, the dynamic routing component 202 may include a path determining component 204 configured to generate or otherwise determine a path to follow to a destination, a graph generating component 206 configured to generate and/or update a local graph, an overlap determining component 208 configured to determine overlap data associated with driving lane(s) and the path, a cost determining component 210 configured to generate a cost associated with following a driving lane to the destination, and/or a painting component 212 configured to generate one or more colored top-down representations of driving lane(s).

In some examples, the dynamic routing component 202 may receive a destination 214 to which the vehicle is to travel. The dynamic routing component 202 may receive the destination 214 from one or more computing systems of the vehicle and/or from one or more external systems. The destination 214 may include an x-y coordinate (e.g., global coordinate frame or local coordinate frame) representing the location of the destination 214 within the environment. The destination 214 may be sent to the path determining component 204.

In some examples, the dynamic routing component 202 may receive map data 216 based on the destination 214. The dynamic routing component 202 may receive map data 216 of the region of the environment between the starting location of the vehicle and the destination 214. In some examples, the dynamic routing component 202 may receive the map data 216 from an external map server, and/or may store the map data 216 in an internal storage. For instance, the autonomous vehicle may request a receive map data 216 from a remote map server, based on the destination 214 to which the vehicle is to travel, and store one or more maps locally on the vehicle. In some examples, map data 216 can include any number of data structures, modeled in two or more dimensions that are capable of providing information about the environment, such as, but not limited to, road network data, topologies, intersections, streets, roads, terrain, and the environment in general. The map data 216 may also represent various map features within the environment along the route, including but not limited to roads, lanes, curbs, shoulders, crosswalks, buildings, medians, street signs, traffic signs, speed limits, etc. In some examples, the map data 216 may be sent to the path determining component 204 within the dynamic routing component 202. Though shown that the path determining component 204 receives the map data 216, in other examples any other component of the dynamic routing component 202 may receive the map data 216.

In some examples, the dynamic routing component 202 may include a path determining component 204 configured to generate or otherwise determine a path to follow to a destination. The path determining component 204 may receive the map data 216 and the destination 214. In some examples, the path determining component 204 may generate a path through the environment to the destination 214. The path determining component 204 may utilize the map data 216 to identify a starting location of the vehicle in the map data 216 and the destination 214 in the map data 216. Based on identifying the starting location and the destination 214 in the map data 216, the path determining component 204 may perform a shortest path operation (e.g., Dijkstra's Algorithm) between the starting location and the destination 214. The result of the shortest path algorithm may be a single path for the vehicle to follow to the destination 214.

In some examples, the dynamic routing component 202 may include a graph generating component 206 configured to generate and/or update a local graph. The graph generating component 206 may receive the path, the map data 216, and/or the destination 214 from the path determining component 204 and/or from any other component. In some examples, the graph generating component 206 may generate a local graph that includes the road segments (e.g., combination of driving lanes) between the starting location and the destination 214. Further, the local graph may extend a portion of the distance between the vehicle location to the destination 214. Additionally or alternatively, the local graph may extend a distance behind the vehicle (or in the opposite direction of the travel of the vehicle) such that the vehicle may be encompassed within the local graph. Specifically, the extent or local search horizon may be a distance larger than the trajectory search horizon but less than the entire distance to the destination 214. Accordingly, the graph generating component 206 may generate the local graph that includes some or all driving lanes in a region proximate the vehicle.

In some examples, the dynamic routing component 202 may include an overlap determining component 208 configured to determine overlap data associated with driving lane(s) and the path. The overlap determining component 208 may receive the path, the local graph, map data 216, and/or the destination 214. In some examples, the overlap determining component 208 may determine, for some or all driving lanes within the local graph, a unique degree of overlap with the path. Specifically, if there are four driving lanes within the local graph, the overlap determining component 208 may determine a first overlap value for the first driving lane, a second overlap value for the second driving lane, a third overlap value for the third driving lane, and a fourth overlap value for the fourth driving lane.

In some examples, the overlap determining component 208 may determine the overlap values based on the distance that the path overlaps with the driving lane. That is, the overlap determining component 208 may measure the distance along the driving lane that the path and the driving lane overlap. Further, the overlap determining component 208 may determine a modified distance by subtracting the distance from the start of the driving lane to the vehicle location from the overall distance measurement. Without subtracting the vehicle position from the overall overlap value there could be a large overlap value even if the path goes off route only a few meters in front of the vehicle.

In some examples, the dynamic routing component 202 may include a cost determining component 210 configured to generate a cost associated with following a driving lane to the destination. The cost determining component 210 may determine a cost value for some or all driving lanes within the local graph. For example, if there are four driving lanes within the local graph, the cost determining component 210 may determine a first cost for the first driving lane, a second cost for the second driving lane, a third cost for the third driving lane, and a fourth cost for the fourth driving lane. In such cases, the cost may be a time-based cost determined based on a combination of the speed limit of the driving lane and/or a distance to the destination using the driving lane. The distance to the destination using the driving lane may be determined using one or more shortest path algorithms such as Dijkstra's Algorithm.

In some examples, the dynamic routing component 202 may include a painting component 212 configured to generate one or more colored top-down representations of driving lane(s). The painting component 212 may receive the cost data, the overlap data, the local graph, the path, the map data 216, the destination 214, and/or any other type of information. The painting component 212 may generate one or more top-down representations (or images) that include one or more painted (or colored) relevant driving lanes. The painting component 212 may determine or otherwise identify the relevant driving lanes by ranking the driving lane(s) and selecting the top (or a subset of) threshold number of driving lanes. For example, the painting component 212 includes a subcomponent called the ranking component 218 that may be configured to identify the relevant driving lanes to include the top-down representation(s). The ranking component 218 may rank the driving lanes based on overlap values. Specifically, the driving lanes with the highest overlap values may be the highest ranked driving lanes. In such cases, the ranking component 218 may select a subset of the driving lanes. Specifically, the ranking component may select the N highest ranked driving lanes (e.g., where N is a positive integer larger than 0). If there are multiple driving lanes with the same overlap value, the ranking component 218 may perform a sub-ranking amongst such driving lanes.

The sub-ranking may be based on cost values. That is, the highest ranked driving lanes may be the driving lanes with the lowest cost values. In such instances, the ranking component 218 may select the N highest ranked driving lanes. The selected driving lane(s) may be representative of the relevant driving lane(s).

In some examples, the painting component 212 may paint the driving lanes according to one of three different techniques. As noted above, the first technique may be to generate a separate, independent top-down image for each relevant driving lane, the second technique may be to generate a single top-down image that includes all of the relevant driving lanes, and the third technique may be to generate four independent top-down images each of which including all of the driving lanes and each of the four images being associated with a specific type of metric.

According to the first technique, the painting component 212 may generate a unique top-down image for each of the relevant driving lanes. Further, the painting component 212 may paint the top-down image a certain color based on determining one or more sub-scores. The sub-scores may correspond to one or more types of metrics. Further, the painting component 212 may determine the sub-scores for each of the relevant driving lanes. For example, the painting component 212 may determine a first sub-score (e.g., T1 from above) based on a first type of metric that is based on how far the vehicle is from the destination (e.g., penalize the score the further the vehicle is away from the destination), a second sub-score (e.g., T2 from above) based on a second type of metric that is based on the number and/or types (e.g., optional, required, etc.) of lane changes associated with following the driving lane to the destination (e.g., penalize staying in a when a lane change is required, encourage lane changes into target lanes, etc.), a third sub-score (e.g., T3 from above) based on a third type of metric that is distance-based and scaled starting from the location of the vehicle to a predetermined distance (e.g., destination, boundary of local graph, etc.), and a fourth sub-score (e.g., T4 from above) based on a third type of metric that weights the current driving lane using the cost values (e.g., sub-score=$\alpha*(C_{max}-C_{min})/(C_{max}-C_{min})$) discussed above. The $C_{max}$ may be the maximum cost of the multiple costs associated with the relevant driving lanes and the $C_{min}$ may be the minimum cost of the multiple costs associated with the relevant driving lanes.

In some examples, the painting component 212 may paint the top-down images of the first technique based on inputting the sub-scores determined above into Equation 1 described above. The result of Equation 1 may be a value that maps to a color value which the painting component 212 may use to paint the pixels of the image. Additional description regarding the operations for the first technique are discussed in FIG. 4.

According to the second technique, the painting component 212 may combine the relevant driving lanes into a single top-down image that includes various different colors. In this technique, the painting component 212 may determine T1-T4 scores as described in the first technique. Further, the painting component 212 may determine which color to paint (or otherwise associate) with each pixel in the image by inputting the T1-T4 values of each driving lane into Equation 2 as described above. The result of such operations may be a color that can be used to paint the associated pixel. Additional description regarding the operations for the second technique are discussed in FIG. 5.

According to the third technique, the painting component 212 may generate four different top-down images, one for T1, one for T2, one for T3, and one for T4. In such images, the painting component 212 may include each of the relevant driving lanes within each of the four top-down images. In this technique, the painting component 212 may determine T1-T4 scores as described in the first technique. Based on determining such scores for each of the relevant driving lanes, the painting component 212 may input the scores into Equation 2 to determine the color value to paint the associated pixel. That is, if the dynamic routing component is painting the color values of the first colored top-down image that corresponds to the first metric (e.g., T1), the painting component 212 may input the T1 scores for each of the four driving lanes into Equation 2 and the use the result as the color to paint the associated pixel. The painting component 212 may perform such operations on the remaining top-down images. Additional description regarding the operations for the third technique are discussed in FIG. 6.

Based on performing the operations of any combination of the first, second, and/or third techniques, the painting component 212 may send the colored top-down image(s) 220 to one or more downstream prediction and/or planning components 222. That is, the prediction and/or planning components 222 may use the colored top-down image(s) 220 to evaluate the environment and/or determine one or more actions for the vehicle to perform.

Figure 3:
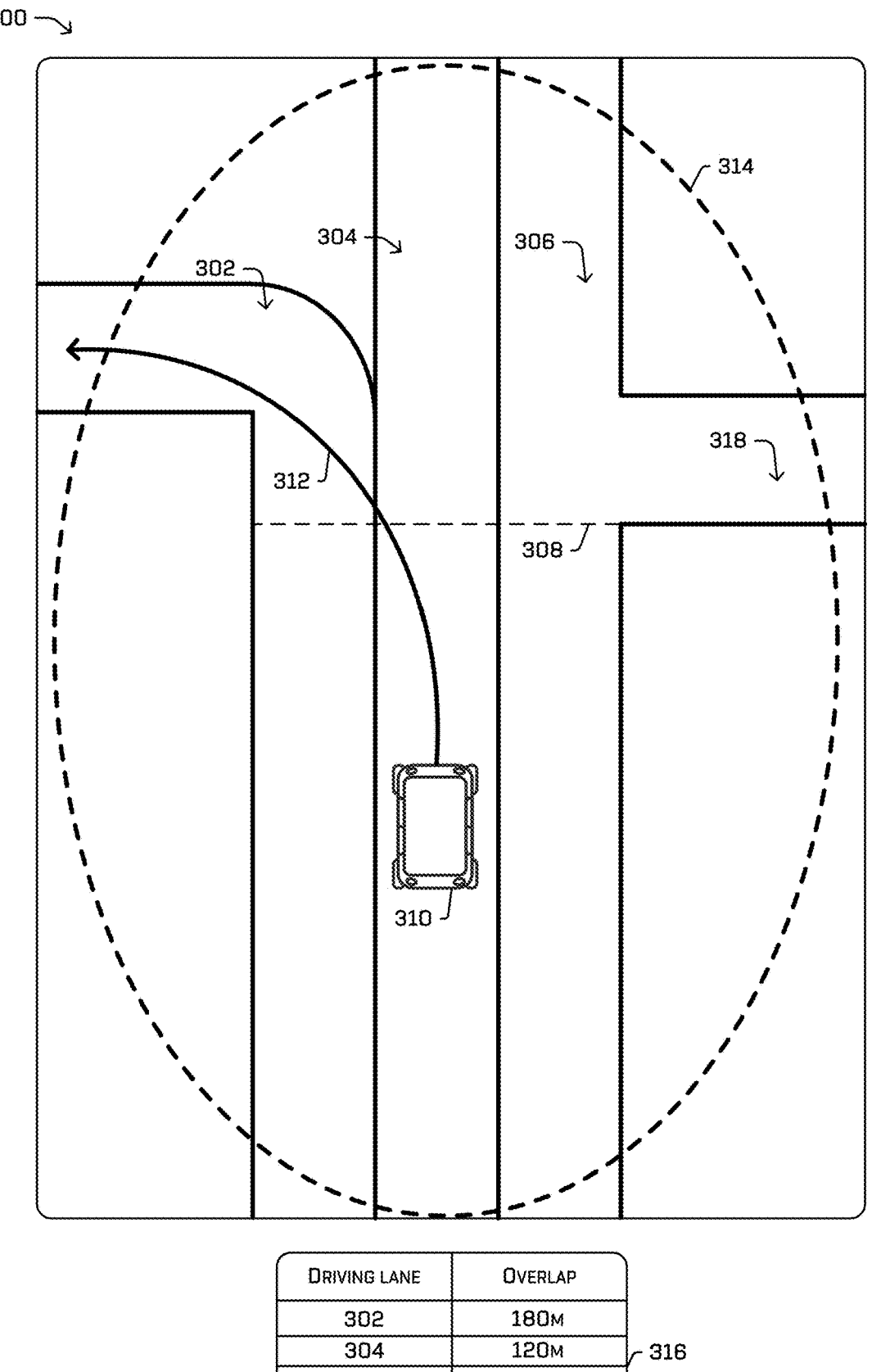
FIG. 3 depicts an example environment that includes multiple driving lanes and/or a table with data representative of overlap and/or cost data associated with the multiple driving lanes, in accordance with one or more examples of the disclosure.

FIG. 3 depicts an example environment 300 that includes multiple driving lanes and/or a table with data representative of overlap and/or cost data associated with the multiple driving lanes.

In this example, the example environment 300 may include multiple driving lanes. That is, the example environment 300 may include the driving lane 302, the driving lane 304, and the driving lane 306 which includes a splitting driving lane 318. As shown, the driving lane 302 may include a left turn, the driving lane 304 may proceed straight, and the driving lane 306 may proceed straight which driving lane 318 splits from driving lane 306 and includes a right turn. In some cases, driving lane 302, driving lane 304, and driving lane 306 may be associated with the same road segment (e.g., the combination of one or more driving lanes of the same length traveling in the same direction) until the dashed line 308 which may mark the end of the road segment. As shown, driving lane 318 may be located beyond the dashed line 308 which indicates that the driving lane 318 is not associated with the same road segment.

As shown, the example environment 300 may include a vehicle 310 which may be navigating to a destination. In this case, one or more systems of the vehicle 310 may generate a path 312 for the vehicle 310 to follow. As indicated above, the vehicle 310 may generate the path 312 based on identifying a starting location of the vehicle and the destination location in map data and performing a shortest path operation. The shortest path operation may result in a single path which may be the path 312. Similar to FIG. 1, the path 312 may overlap or span all laterally adjacent lanes within a road segment. As such, the path 312 may overlap the driving lane 302, the driving lane 304, and the driving lane 306 prior to the road segment ending as indicated by the dashed line 308. Since the driving lane 318 is associated with the driving lane 306 prior to splitting to the right, the driving lane 318 may overlap with the path 312 until the dashed line 308. After the dashed line 308, the path may overlap with some or all laterally adjacent driving lanes in the next road segment. In this case, the next road segment may include the driving lane 302 as the sole driving lane.

As shown, the example environment 300 may include a local graph 314. The vehicle 310 may generate the local graph 314 using map data which may include road segment data, driving lane data, and/or various other types of data. In such instances, the local graph 314 may include one or more road segments and/or driving lanes that are within a local search horizon. That is, the local search horizon may extend a portion of the environment that the vehicle 310 may search and/or evaluate when generating the top-down images. The boundary of the local graph 314 may be illustrated by the dashed circle encompassing the driving lanes, the vehicle 310, the path 312, etc.

In some examples, the example environment 300 may also include a table 316 that includes overlap data of each of the driving lanes. The vehicle 310 may determine the overlap values that go into the table 316 by determining a distance that the path 312 and the driving lanes within the local graph 314 overlap. For example, the vehicle 310 may determine the overlap value for the driving lane 306 by determining the distance that the path and the driving lane 306 overlap. In this case, the path 312 overlaps with the driving lane 306 from the location of the vehicle 310 to the dashed line 308 which marks the end of the road segment with which the driving lane 304 is associated. Since the driving lane 306 is not associated with the next road segment the path 312 encounters, the vehicle 310 may determine that the distance corresponds to just the distance between the vehicle and the dashed line 308. As shown in the table 316, the overlap of the driving lane 306 may be 120 meters. Further, the overlap value for the driving lane 318 may be determined by the distance that the path 312 and the driving lane 306 and/or 318 overlap. As shown, the overlap of the driving lane 318 may be 120 meters.

In some examples, the vehicle 310 may determine the degree of overlap with the driving lane 304. For example, the vehicle 310 may determine the overlap value for the driving lane 304 by determining the distance that the path 312 and the driving lane 304 overlap. In this case, the path 312 overlaps with the driving lane 304 from the location of the vehicle 310 to the dashed line 308 which marks the end of the road segment with which the driving lane 304 is associated. Since the driving lane 304 is not associated with the next road segment the path 312 encounters, the vehicle 310 may determine that the distance corresponds to just the distance between the vehicle and the dashed line 308. As shown in the table 316, the overlap of the driving lane 304 may be 120 meters.

In some examples, the vehicle 310 may determine the degree of overlap with the driving lane 302. For example, the vehicle 310 may determine the overlap value for the driving lane 302 by determining the distance that the path 312 and the driving lane 302 overlap. In this case, the path 312 overlaps with the driving lane 302 from the location of the vehicle 310 to the dashed line 308 which marks the end of the road segment with which the driving lane 302 is associated. However, since the driving lane 302 is associated with the next road segment the path 312 encounters, the vehicle 310 may determine the distance the path 312 and the driving lane 302 overlap in the next road segment as well. As shown in the table 316, the overlap of the driving lane 302 may be 180 meters. In some examples, the vehicle 310 may use the overlap data associated with the driving lanes to identify relevant driving lanes within the local graph 314, to generate sub-scores as described above, and/or to generate colored top-down images used to control the vehicle 310.

Figure 4:
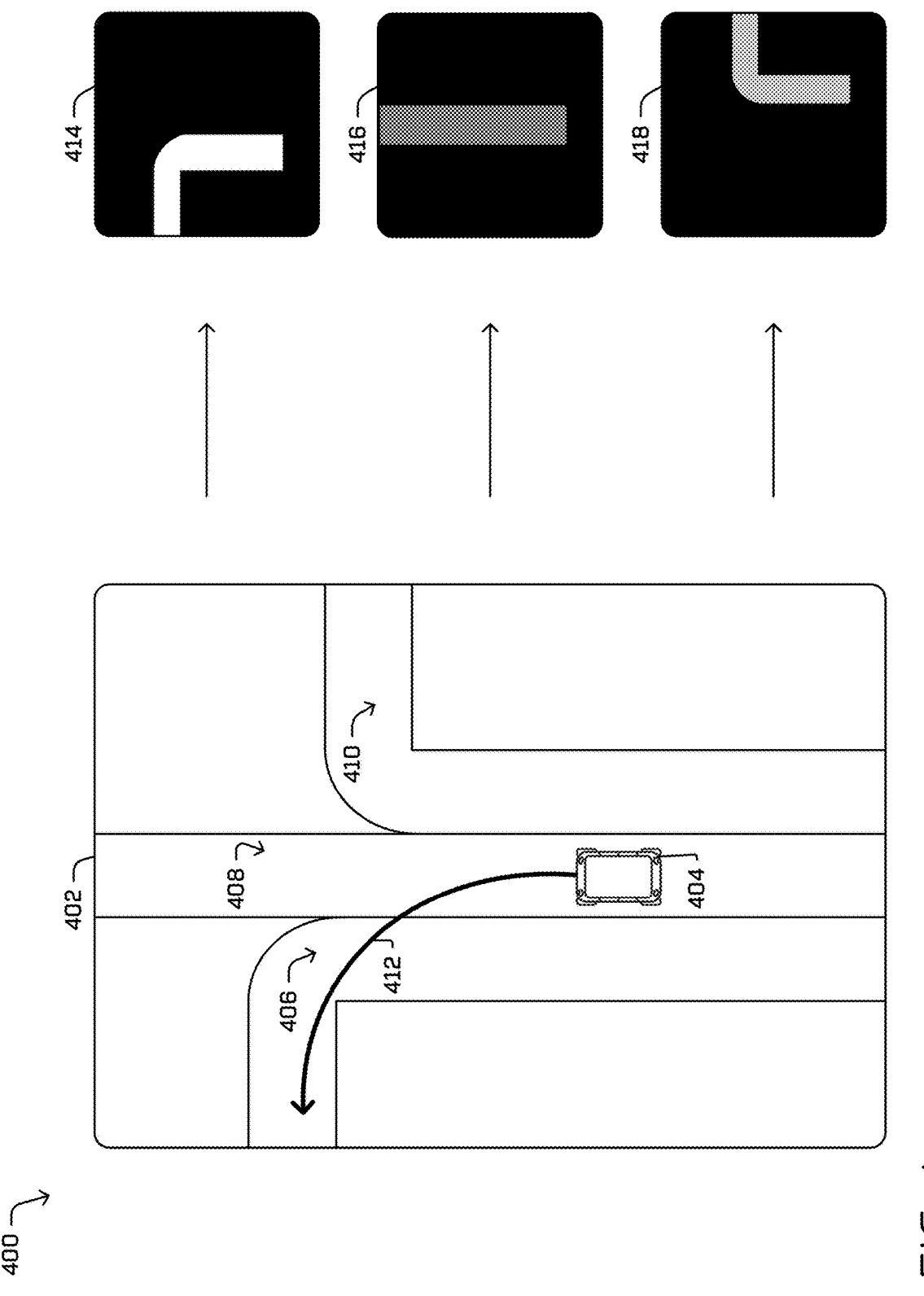
FIG. 4 illustrates determining multiple top-down representations each of which being associated with a single driving lane, in accordance with one or more examples of the disclosure.

FIG. 4 illustrates determining multiple colored top-down representations 400 with a single driving lane associated with each colored top-down representation. Specifically, FIG. 4 illustrates generating multiple top-down images with each image being associated with a driving lane.

In this example, FIG. 4 may include an example driving environment 402 that includes multiple driving lanes and a vehicle 404. As shown, the example driving environment 402 may include a driving lane 406, a driving lane 408, and a driving lane 410. As shown, the driving lane 406 may include a left turn, the driving lane 408 may proceed straight, and the driving lane 410 may include a right turn.

As described above, the vehicle 404 may generate a path 412 to follow to a destination. That path 412 may be a spatial representation of the optimal path to the destination. Further, as indicated above, the vehicle 404 may determine a degree of overlap between the path 412 and the driving lanes and use such data to determine (or identify) relevant driving lanes. Based on the relevant driving lane(s), the vehicle 404 may generate one or more colored top-down images to be sent to downstream processes. The vehicle 404 may generate the colored top-down image(s) according to the first, second, and/or third techniques described above. For the purposes of FIG. 4, the vehicle 404 may perform the operations consistent with the first technique.

Accordingly, the vehicle 404 may generate multiple, independent, colored top-down images each of which correspond to a certain driving lane. That is, FIG. 4 illustrates multiple colored top-down images. For example, FIG. 4 may include an image 414 that may be a colored top-down image of the driving lane 406, an image 416 that may be a colored top-down image of the driving lane 408, and an image 418 that may be a colored top-down image of the driving lane 410. As described in above and in FIG. 2, the vehicle 404 may determine the color to paint the driving lanes by determining one or more sub-scores and inputting such scores into Equation 1 described above. The result from Equation 1 may be a value that maps to a color value which may then be associated with the pixels corresponding to the driving lane. As shown, the image 414 may be a painted with a white color value, the image 416 may be painted with a dark grey color value, and the image 418 may be painted with a light grey color value. Accordingly, the vehicle 404 may send the colored top-down images to one or more prediction and/or planning components configured to analyze the images to determine one or more actions for the vehicle 404 to perform.

Figure 5:
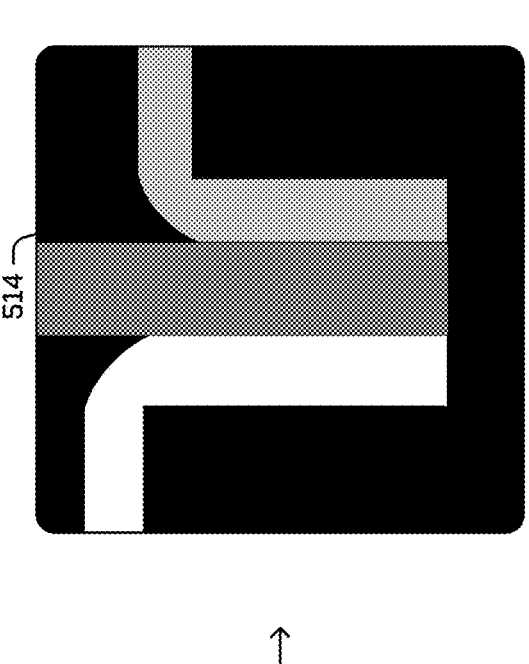
FIG. 5 illustrates determining a single top-down representation that includes multiple driving lanes therein, in accordance with one or more examples of the disclosure.
Figure 5:
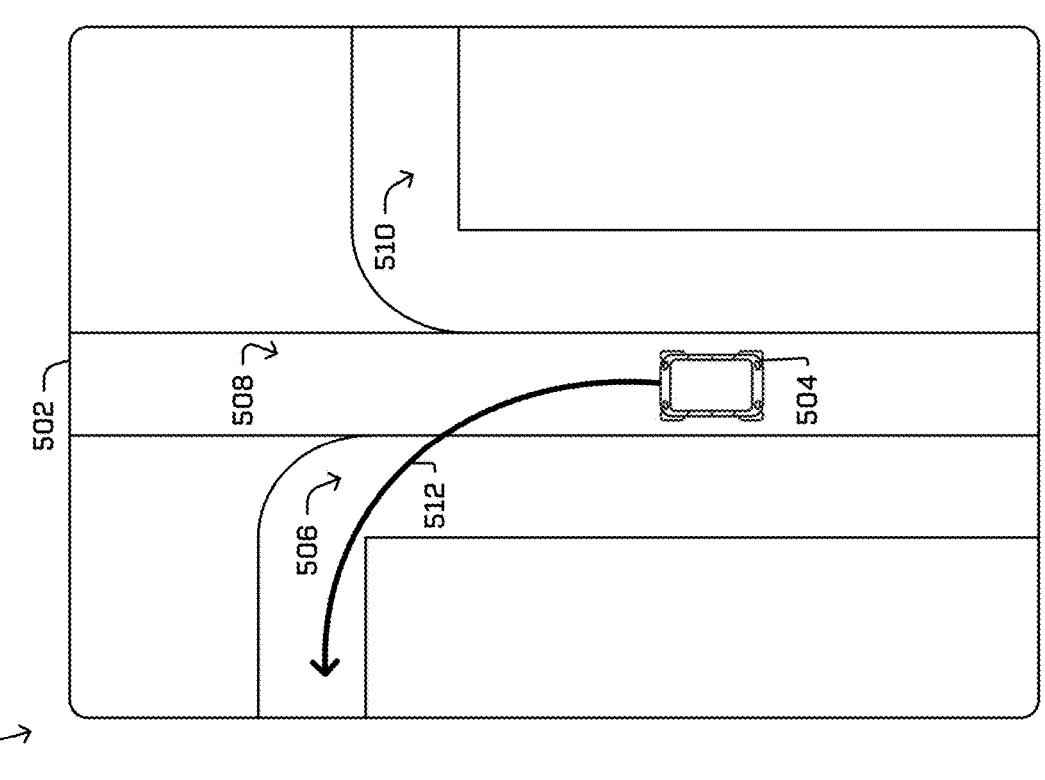

FIG. 5 illustrates determining a single colored top-down representation 500 that includes multiple driving lanes therein. Specifically, FIG. 5 illustrates generating a single top-down image that includes some or all of the relevant driving lanes.

In this example, FIG. 5 may include an example driving environment 502 that includes multiple driving lanes and a vehicle 504. As shown, the example driving environment 502 may include a driving lane 506, a driving lane 508, and a driving lane 510. As shown, the driving lane 506 may include a left turn, the driving lane 508 may proceed straight, and the driving lane 510 may include a right turn.

As described above, the vehicle 504 may generate a path 512 to follow to a destination. That path 512 may be a spatial representation of the optimal path to the destination. Further, as indicated above, the vehicle 504 may determine a degree of overlap between the path 512 and the driving lanes and use such data to determine (or identify) relevant driving lanes. Based on the relevant driving lane(s), the vehicle 504 may generate one or more colored top-down images to be sent to downstream processes. The vehicle 504 may generate the colored top-down image(s) according to the first, second, and/or third techniques described above. For the purposes of FIG. 5, the vehicle 504 may perform the operations consistent with the second technique.

Accordingly, the vehicle 504 may generate a single top-down image that includes colored representations of the driving lanes. For example, FIG. 5 illustrates an image 514 that may be a colored top-down representation of the example driving environment 502. Specifically, the image 514 may include the driving lane 506, the driving lane 508, and the driving lane 510. As described above, the vehicle 504 may determine the color to paint the driving lanes by determining one or more sub-scores and inputting such scores into Equations 1 and/or 2. The result from the equations may be a value that maps to a color value which may then be associated with the pixels corresponding to the driving lane. As shown, image 514 may include the driving lane 506 painted in a white color, the driving lane 508 painted in a dark grey color, and the driving lane 510 painted in a light grey color. Accordingly, the vehicle 504 may send the colored top-down image to one or more prediction and/or planning components configured to analyze the image to determine one or more actions for the vehicle 4504 to perform.

Figure 6:
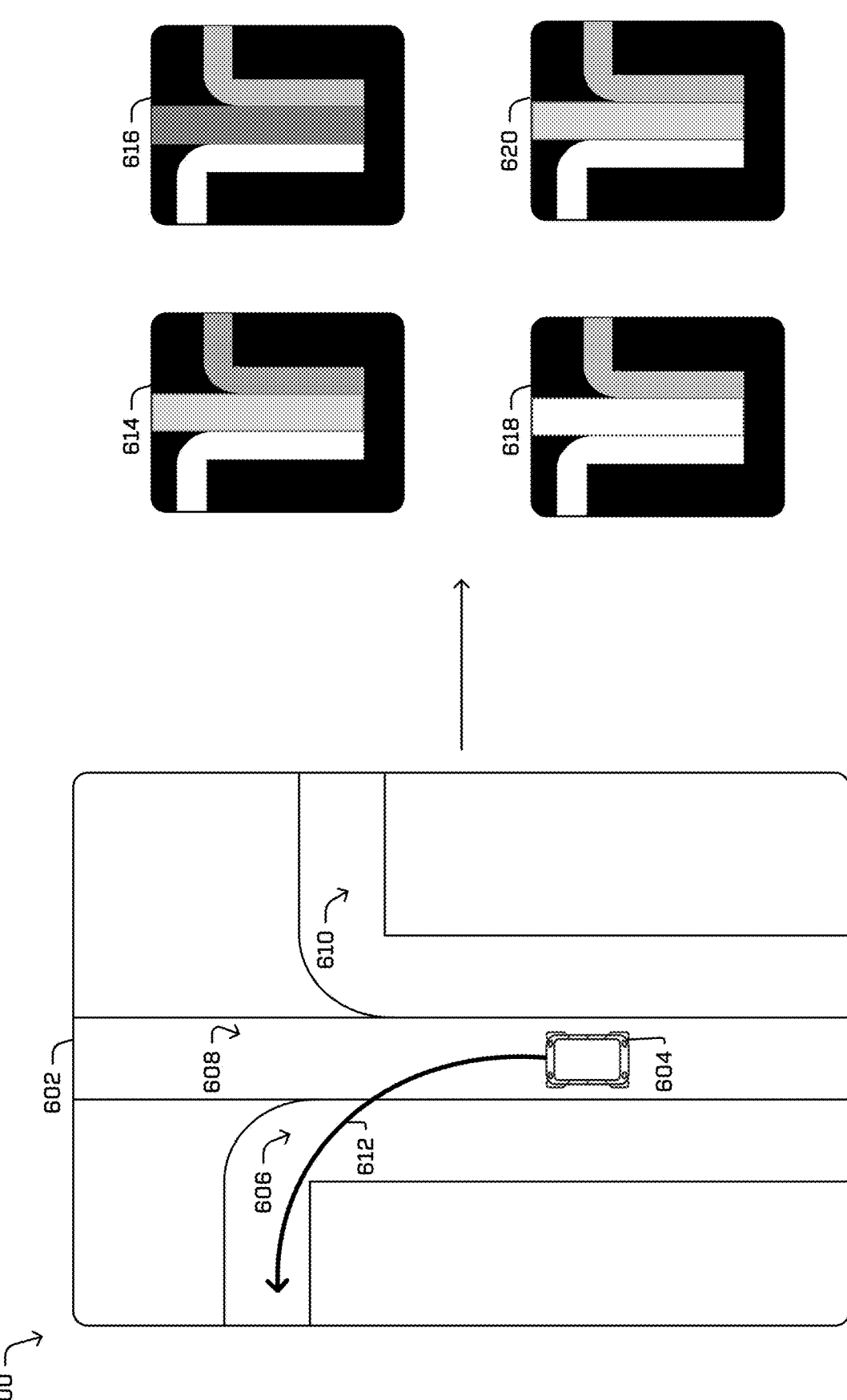
FIG. 6 illustrates determining multiple top-down representations each of which associated with a type of scoring metric and including multiple driving lanes, in accordance with one or more examples of the disclosure.

FIG. 6 illustrates determining multiple colored top-down representations 600 with multiple driving lanes associated with each colored top-down representation. Specifically, FIG. 6 illustrates generating multiple top-down images each of which corresponding to a type of scoring metric.

In this example, FIG. 6 may include an example driving environment 602 that includes multiple driving lanes and a vehicle 604. As shown, the example driving environment 602 may include a driving lane 606, a driving lane 608, and a driving lane 610. As shown, the driving lane 606 may include a left turn, the driving lane 608 may proceed straight, and the driving lane 610 may include a right turn.

As described above, the vehicle 604 may generate a path 612 to follow to a destination. That path 612 may be a spatial representation of the optimal path to the destination. Further, as indicated above, the vehicle 404 may determine a degree of overlap between the path 612 and the driving lanes and use such data to determine (or identify) relevant driving lanes. Based on the relevant driving lane(s), the vehicle 404 may generate one or more colored top-down images to be sent to downstream processes. The vehicle 404 may generate the colored top-down image(s) according to the first, second, and/or third techniques described above. For the purposes of FIG. 6, the vehicle 604 may perform the operations consistent with the third technique.

Accordingly, the vehicle 604 may generate four top-down images that include colored representations of the driving lanes and correspond to one of the sub-scoring metrics. As noted above, when determining the color of the driving lane, the vehicle may determine four sub-scores, T1-T4. For example, the vehicle 604 may determine a first sub-score (e.g., T1) based on a first type of metric that is based on how far the vehicle is from the destination, a second sub-score (e.g., T2) based on a second type of metric that is based on the number and/or types of lane changes associated with following the driving lane to the destination, a third sub-score (e.g., T3) based on a third type of metric that is distance-based and scaled starting from the location of the vehicle to a predetermined, and a fourth sub-score (e.g., T4) based on a fourth type of metric that weights the current driving lane using the cost values discussed above. In such instances, the images may correspond to the values determined for the types of scoring metrics.

For example, FIG. 6 illustrates an image 614 that may be a colored top-down representation that corresponds to the first type of metric, an image 616 that may be a colored top-down representation that corresponds to the second type of metric, an image 618 that may be a colored top-down representation that corresponds to the third type of metric, and an image 620 that may be a colored top-down representation that corresponds to the fourth type of metric. As shown, each of the images may include the driving lane 606, the driving lane 608, and the driving lane 610.

As described above, the vehicle 604 may determine the color to paint the driving lanes by determining one or more sub-scores and inputting such scores into Equations 1 and/or 2. In this example, the vehicle 604 may determine the T1-T4 scores for the three driving lanes and, for each image, input the corresponding metric score into Equations 1 and/or 2. The result from the equations may be a value that maps to a color value which may then be associated with the pixels corresponding to the driving lane. As shown, image 614 may include the driving lane 606 painted in a white color, the driving lane 608 painted in a light grey color, and the driving lane 610 painted in a medium grey color. The image 616 may include the driving lane 606 painted in a white color, the driving lane 608 painted in a dark grey color, and the driving lane 610 painted in a light grey color. The image 618 may include the driving lane 606 painted in a white color, the driving lane 608 painted in a white color, and the driving lane 610 painted in a light grey color. The image 620 may include the driving lane 606 painted in a white color, the driving lane 608 painted in a light grey color, and the driving lane 610 painted in a light grey color (e.g., different light grey than the light grey of the driving lane 608). Accordingly, the vehicle 604 may send the four colored top-down images to one or more prediction and/or planning components configured to analyze the images to determine one or more actions for the vehicle 604 to perform.

Figure 7:
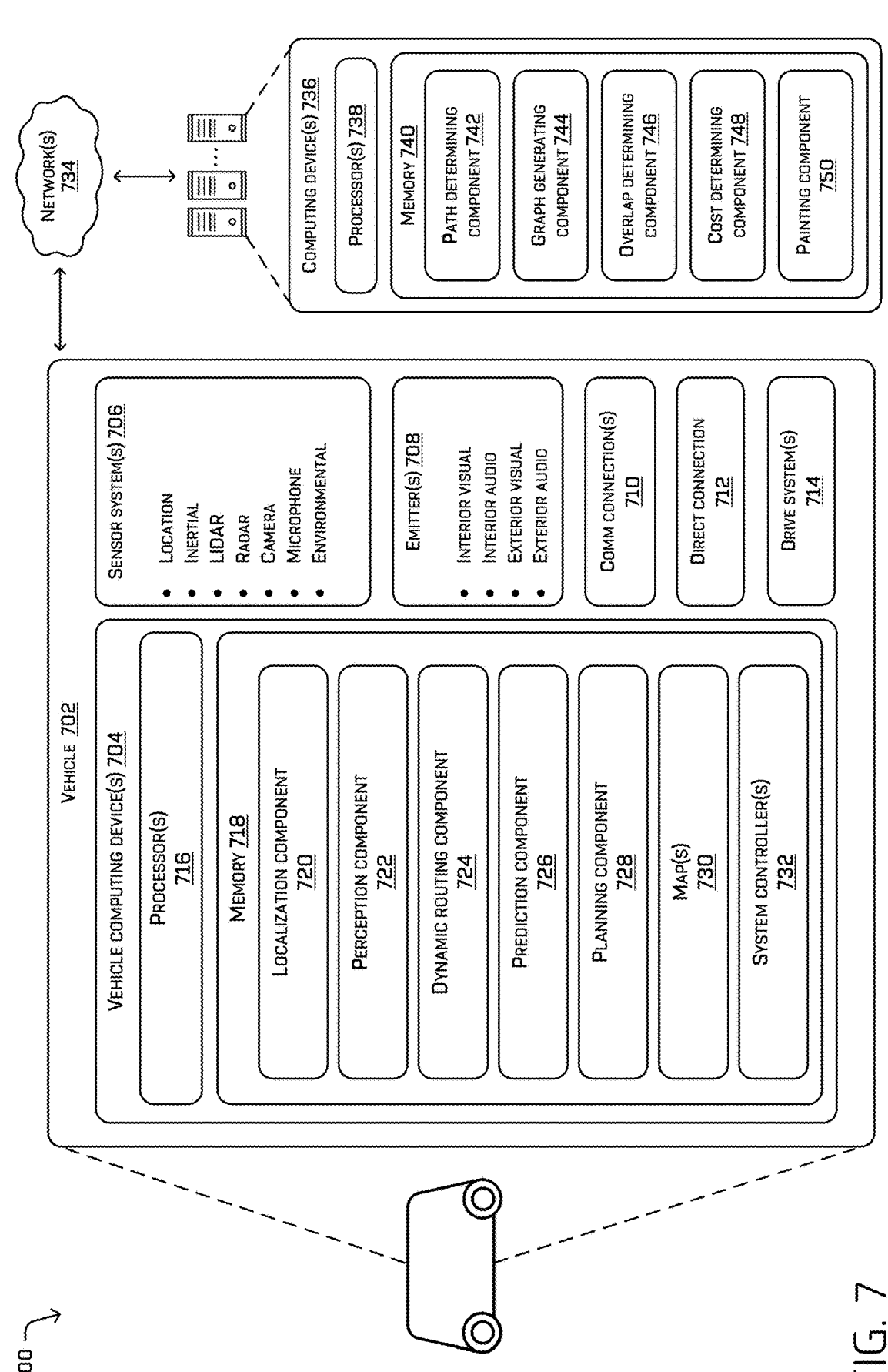
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, a dynamic routing component 724, a prediction component 726, a planner component 728, one or more system controllers 732, and one or more maps 730 (or map data). Though depicted in FIG. 6 as residing in the memory 718 for illustrative purposes, it is contemplated that the localization component 720, the perception component 722, the dynamic routing component 724, the prediction component 726, the planner component 728, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736 (e.g., a remote computing device)). In some examples, the memory 740 may include a path determining component 742, a graph generating component 744, an overlap determining component 746, a cost determining component 748, and a painting component 750.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

The dynamic routing component 724 may perform any of the techniques described with respect to any of FIGS. 1-6 above with generating one or more colored top-down images to enable dynamic routing of a vehicle.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the dynamic routing component 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the dynamic routing component 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include a path determining component 742, a graph generating component 744, an overlap determining component 746, a cost determining component 748, and a painting component 750. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the path determining component 742, the graph generating component 744, the overlap determining component 746, the cost determining component 748, and the painting component 750 may perform substantially similar functions as the dynamic routing component 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s)

of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 8 is a flow diagram illustrating an example process 800 for determining a path to a destination, determining a graph that includes a driving lane, determining an overlap between the path and the driving lane in the graph, determining a color based on the overlap, determining a colored top-down representation of the driving lane based on the color, and controlling the vehicle based on the colored top-down representation of the driving lane. As described below, the example process 800 may be performed by one or more computer-based components configured to implement various functionalities described herein. For instances, process 800 may be performed using a dynamic routing component 202.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the dynamic routing component may receive a destination associated with an environment. The vehicle may receive instruction(s) (e.g., transport passenger(s), deliver item(s), etc.) to navigate from a starting location to an ending location (or destination). Such instruction(s) may be received from a fleet management system, a remote operating system, a passenger or a passenger device, a future passenger, and/or any other source. In some examples, a destination may be a location within the environment to which the vehicle is to navigate. That is, the instructions may include a location (e.g., x-y coordinate) within the environment associated with a destination.

At operation 804, the dynamic routing component may determine a path for a vehicle to follow to the destination. In some examples, the dynamic routing component may determine the path by identifying the optimal path from the position of the vehicle to the destination. For instance, the dynamic routing component may receive map data representing the environment between the vehicle and the destination and identify the shortest path from the vehicle to the destination. Such operations may be performed using one or more shortest path algorithms such as Dijkstra's Algorithm, A*, D*, etc. Accordingly, upon performing the shortest path algorithm, the dynamic routing component may receive, determine, or otherwise identify a single path representing the shortest distance to the destination.

At operation 806, the dynamic routing component may determine a graph comprising a road segment that includes multiple driving lanes. A local graph may be a graph or map that represents the road segments and/or driving lane(s) of the physical environment spanning or otherwise covering a smaller portion of the physical environment than that of the entire distance to the destination, while also extending beyond the distance covered by candidate trajectories. That is, the local graph may cover a larger distance from the vehicle than the distance covered by the candidate trajectories. The region of the physical environment covered by the local graph may define a local search horizon corresponding to the local graph. The local search horizon may be the region within which the dynamic routing component may evaluate when determining the colored top-down representations of driving lanes. The dynamic routing component may generate the local graph based on map data, such as road network data, lane segment data (e.g., lane segment dimension, location, shape, type, etc.), and/or any other type of data.

At operation 808, the dynamic routing component may determine a degree of overlap between the path and a driving lane of the multiple driving lanes. An overlap represents how much a given driving lane spatially overlaps with the path. Specifically, the overlap may be a distance-based measurement that measures the distance the path overlaps with the driving lane starting from the current location of the vehicle. For example, a vehicle may be located on a road segment that includes two laterally adjacent driving lanes. In this example, the first driving lane may turn right in 75 meters from the vehicle while the second driving lane continues straight to the border of the local graph. As such, since the path laterally spans both driving lanes, the dynamic routing component may determine a first degree of overlap with the first driving lane and a second degree of overlap with the second driving lane. In this example, the path may continue straight to the border of the local graph. Accordingly, the degree of overlap for the first driving lane may be 75 meters since the path overlaps with the first driving lane until the point at which the first driving lane turns right. Further, the degree of overlap for the second driving lane may be 250 meters (e.g., the distance to the border of the local graph) since the path overlaps with the second driving lane through the local search horizon. Of course, in other examples the local search horizon may be larger or smaller which may result in the degree of overlap for the second driving lane being larger or smaller.

At operation 810, the dynamic routing component may determine a ranking of the multiple driving lanes based on overlap data. That is, the dynamic routing component may identify relevant driving lanes by ranking the driving lanes within the local graph. Accordingly, the driving lanes may be ranked according to overlap data. Specifically, the driving lanes may be ranked with the highest rank corresponding to the driving lane with the highest degree of overlap and the lowest rank corresponding to the driving lane with the lowest degree of overlap.

At operation 812, the dynamic routing component may determine whether the driving lane is among a threshold highest ranked driving lanes. The dynamic routing component may determine or otherwise receive a threshold number of driving lanes and select the top threshold number of driving lanes to be considered relevant. In those examples in which there are less lanes than number to be compared, all lanes may be used. If the driving lane is not among the threshold highest ranked driving lanes (812: No), the dynamic routing component may not paint the driving lane. That is, at operation 814, the dynamic routing component may determine not to paint the driving lane based on the driving lane not being considered relevant to the vehicle.

In contrast, if the driving lane is among the threshold highest ranked driving lanes (812: Yes), the dynamic routing component may determine that the driving lane is a relevant driving lane. Accordingly, at operation 816, the dynamic routing component may determine a color to associate with a top-down representation of the driving lane based on the degree of overlap. The way in which the dynamic routing component determines the color to associate with the driving lane (or the pixels associated thereto) may be based on which of the three techniques (as described above) the dynamic routing component may utilize. Accordingly, to determine the color values, the dynamic routing component may determine an overall score based on determining one or more sub-scores. The sub-scores may correspond to one or more types of metrics. For example, the dynamic routing component may determine a first sub-score (e.g., T1) based on a first type of metric that is based on how far the vehicle is from the destination (e.g., penalize the score the further the vehicle is away from the destination), a second sub-score (e.g., T2) based on a second type of metric that is based on the number and/or types (e.g., optional, required, etc.) of lane changes associated with following the driving lane to the destination (e.g., penalize staying in a when a lane change is required, encourage lane changes into target lanes, etc.), a third sub-score (e.g., T3) based on a third type of metric that is distance-based and scaled starting from the location of the vehicle to a predetermined distance (e.g., destination, boundary of local graph, etc.), and a fourth sub-score (e.g., T4) based on a third type of metric that weights the current driving lane using the cost values (e.g., fourth sub-score=$\alpha*(C_{max}-C_{min})/(C_{max}-C_{min}))$ discussed above. The $C_{max}$ may be the maximum cost of the multiple costs associated with the relevant driving lanes and the $C_{min}$ may be the minimum cost of the multiple costs associated with the relevant driving lanes.

Based on the technique (e.g., first, second, or third technique) and determining the sub-scores, the dynamic routing component may input the T1-T4 scores into Equation 1 and/or Equation 2. The results of the equations may be a value that may map to a color value. The color value may be the color that is used to paint the pixel in the image corresponding to the driving lane.

At operation 818, the dynamic routing component may determine a colored top-down representation of the driving lane based on the color. Based on whether the dynamic routing component is using the first, second, and/or third techniques, the dynamic routing component may generate one or more colored top-down images including one or more of the driving lanes using the color determined at operation 816.

At operation 820, the dynamic routing component may control the vehicle based on the colored top-down representation of the driving lane. In some examples, based on generating the colored top-down image(s) according to the first, second, and/or third techniques, the dynamic routing component may send the colored top-down image(s) to downstream prediction and/or planning systems. Such systems may use the colored top-down image(s) to predict object movements and/or determining future actions for the vehicle to follow throughout the environment.

EXAMPLE CLAUSES

A: A system comprising: one or more processors; and one or more non-transitory computer-readable media storing computer-executable instructions that, when executed, cause the system to perform operations comprising: receiving a destination associated with an environment; determining a path for a vehicle to follow to the destination; determining a plurality of road segments associated with a region of the environment within a threshold distance of the vehicle, wherein a road segment of the plurality of road segments includes a driving lane; determining an amount of overlap between the path and the driving lane; determining, based at least in part on data associated with the driving lane, a cost associated with navigating the driving lane to the destination; determining, based at least in part on the amount of overlap and the cost, a value to associate with a top-down representation of the driving lane; generating a top-down representation of the driving lane comprising the value along the driving lane; and controlling the vehicle based at least in part on the top-down representation of the driving lane.

B: The system of paragraph A, wherein the driving lane is a first driving lane and the top-down representation is a first top-down representation, wherein the road segment comprises a second driving lane, the operations further comprising: determining a second value to associate with the second driving lane; determining, based at least in part on the second value, a second top-down representation of the second driving lane, wherein the second top-down representation is independent from the first top-down representation; and controlling the vehicle based at least in part on the first top-down representation and the second top-down representation.

C: The system of paragraph A, wherein the driving lane is a first driving lane and the top-down representation is a first top-down representation, wherein the road segment comprises a second driving lane, the operations further comprising: determining a second value to associate with the second driving lane; determining, based at least in part on the second value, a second top-down representation of the second driving lane; combining the first top-down representation and the second top-down representation into a single top-down representation; and controlling the vehicle based at least in part on the single top-down representation.

D: The system of paragraph A, the operations further comprising: determining, for a first type of metric, a first score; determining, for a second type of metric that is different than the first type, a second score; determining a second value associated with the first score and a third value associated with the second score; determining, based at least in part on the second value, a second top-down representation of the driving lane associated with the first type of metric; determining, based at least in part on the third value, a third top-down representation of the driving lane associated with the second type of metric, the second top-down representation being independent from the third top-down representation; and controlling the vehicle based at least in part on the second top-down representation and the third top-down representation.

E: The system of paragraph A, wherein determining the amount of overlap is based at least in part on: determining a distance that the path and the driving lane overlap; determining, based at least in part on a position of the vehicle, a modified distance; and causing the modified distance to be the amount of overlap.

F: One or more non-transitory computer-readable media storing instructions executable by one or more processors, wherein the instructions, when executed, cause a system to perform operations comprising: determining a path for a vehicle to follow to a destination; determining a graph comprising a road segment that includes a driving lane; determining a degree of overlap between the path and the driving lane; determining, based at least in part on the degree of overlap, a value to associate with a representation of the driving lane; and determining, based at least in part on the value, the representation of the driving lane.

G: The one or more non-transitory computer-readable media of paragraph F, wherein the driving lane is a first driving lane and the representation is a first representation, wherein the road segment comprises a second driving lane, the operations further comprising: determining a second value to associate with the second driving lane; determining, based at least in part on the second value, a second representation of the second driving lane, wherein the second representation is independent from the first representation; and controlling the vehicle based at least in part on the first representation and the second representation.

H: The one or more non-transitory computer-readable media of paragraph F, wherein the driving lane is a first driving lane and the representation is a first representation, wherein the road segment comprises a second driving lane, the operations further comprising: determining a second value to associate with a second representation of the second driving lane; determining, based at least in part on the second value, a second representation of the second driving lane; combining the first representation and the second representation into a single representation; and controlling the vehicle based at least in part on the single representation.

I: The one or more non-transitory computer-readable media of paragraph F, the operations further comprising: determining, for a first type of metric, a first score; determining, for a second type of metric that is different than the first type, a second score; determining a second value associated with the first score and a third value associated with the second score; determining, based at least in part on the second value, a second representation of the driving lane associated with the first type of metric; determining, based at least in part on the third value, a third representation of the driving lane associated with the second type of metric, the second representation being independent from the third representation; and controlling the vehicle based at least in part on the second representation and the third representation.

J: The one or more non-transitory computer-readable media of paragraph F, wherein determining the degree of overlap is based at least in part on: determining a distance that the path and the driving lane overlap; determining, based at least in part on a position of the vehicle, a modified distance; and causing the modified distance to be the degree of overlap.

K: The one or more non-transitory computer-readable media of paragraph F, wherein determining the value is based at least in part on: determining a cost associated with navigating the driving lane to the destination, wherein the cost is determined based at least in part on at least one of: a speed limit associated with the driving lane, or a distance between the vehicle and the destination.

L: The one or more non-transitory computer-readable media of paragraph F, wherein the road segment includes multiple driving lanes, and wherein determining the value is based at least in part on: determining overlap values for the multiple driving lanes; determining, based at least in part on the overlap values, a ranking of the multiple driving lanes; determining, based at least in part on the ranking, a subset of the multiple driving lanes that meet or exceed a threshold; and determining, based at least in part on the driving lane being in the subset, the value associated with the driving lane.

M: The one or more non-transitory computer-readable media of paragraph F, the operations further comprising: controlling the vehicle based at least in part on the representation of the driving lane.

N: A method comprising: determining a path for a vehicle to follow to a destination; determining a graph comprising a road segment that includes a driving lane; determining a degree of overlap between the path and the driving lane; determining, based at least in part on the degree of overlap, a value to associate with a representation of the driving lane; and determining, based at least in part on the value, the representation of the driving lane.

O: The method of paragraph N, wherein the driving lane is a first driving lane and the representation is a first representation, wherein the road segment comprises a second driving lane, further comprising: determining a second value to associate with the second driving lane; determining, based at least in part on the second value, a second representation of the second driving lane, wherein the second representation is independent from the first representation; and controlling the vehicle based at least in part on the first representation and the second representation.

P: The method of paragraph N, wherein the driving lane is a first driving lane and the representation is a first representation, wherein the road segment comprises a second driving lane, further comprising: determining a second value to associate with a second representation of the second driving lane; determining, based at least in part on the second value, a second representation of the second driving lane; combining the first representation and the second representation into a single representation; and controlling the vehicle based at least in part on the single representation.

Q: The method of paragraph N, further comprising: determining, for a first type of metric, a first score; determining, for a second type of metric that is different than the first type, a second score; determining a second value associated with the first score and a third value associated with the second score; determining, based at least in part on the second value, a second representation of the driving lane associated with the first type of metric; determining, based at least in part on the third value, a third representation of the driving lane associated with the second type of metric, the second representation being independent from the third representation; and controlling the vehicle based at least in part on the second representation and the third representation.

R: The method of paragraph N, wherein determining the degree of overlap is based at least in part on: determining a distance that the path and the driving lane overlap; determining, based at least in part on a position of the vehicle, a modified distance; and causing the modified distance to be the degree of overlap.

S: The method of paragraph N, wherein determining the value is based at least in part on: determining a cost associated with navigating the driving lane to the destination, wherein the cost is determined based at least in part on at least one of: a speed limit associated with the driving lane, or a distance between the vehicle and the destination.

T: The method of paragraph N, wherein the road segment includes multiple driving lanes, and wherein determining the value is based at least in part on: determining overlap values for the multiple driving lanes; determining, based at least in part on the overlap values, a ranking of the multiple driving lanes; determining, based at least in part on the ranking, a subset of the multiple driving lanes that meet or exceed a threshold; and determining, based at least in part on the driving lane being in the subset, the value associated with the driving lane.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

receiving a destination associated with an environment;

determining a path for an autonomous vehicle to follow to the destination;

determining a plurality of road segments associated with a region of the environment within a threshold distance of the autonomous vehicle, wherein a road segment of the plurality of road segments includes a first driving lane;

determining an amount of overlap between the path and the first driving lane;

determining, based at least in part on data associated with the first driving lane, a cost associated with navigating the first driving lane to the destination;

determining, based at least in part on the amount of overlap and the cost, a value to associate with a first top-down representation of the first driving lane;

generating the first top-down representation of the first driving lane comprising the value along the first driving lane;

determining a second top-down representation of a second driving lane, wherein the second top-down representation is independent from the first top-down representation; and controlling a steering system of the autonomous vehicle based at least in part on the first top-down representation of the first driving lane and the second top-down representation of the second driving lane.

2. The system of claim 1, wherein determining the second top-down representation is based at least in part on
 determining a second value to associate with the second driving lane; and
 determining, based at least in part on the second value, the second top-down representation of the second driving lane.

3. The system of claim 1, wherein the road segment comprises a third driving lane, the operations further comprising:
 determining a second value to associate with the third driving lane;
 determining, based at least in part on the second value, a third top-down representation of the third driving lane;
 combining the first top-down representation and the third top-down representation into a single top-down representation; and
 controlling the autonomous vehicle based at least in part on the single top-down representation.

4. The system of claim 1, the operations further comprising:
 determining, for a first type of metric, a first score;
 determining, for a second type of metric that is different than the first type, a second score;
 determining a second value associated with the first score and a third value associated with the second score;
 determining, based at least in part on the second value, a third top-down representation of the first driving lane associated with the first type of metric;
 determining, based at least in part on the third value, a fourth top-down representation of the first driving lane associated with the second type of metric, the third top-down representation being independent from the fourth top-down representation; and
 controlling the autonomous vehicle based at least in part on the third top-down representation and the fourth top-down representation.

5. The system of claim 1, wherein determining the amount of overlap is based at least in part on:
 determining a distance that the path and the first driving lane overlap;
 determining, based at least in part on a position of the autonomous vehicle, a modified distance; and
 causing the modified distance to be the amount of overlap.

6. One or more non transitory computer readable media storing instructions executable by one or more processors, wherein the instructions, when executed, cause a system to perform operations comprising:
 determining a path for an autonomous vehicle to follow to a destination;
 determining a graph comprising a road segment that includes a first driving lane;
 determining a degree of overlap between the path and the first driving lane;
 determining, based at least in part on the degree of overlap, a value to associate with a first representation of the first driving lane;
 determining, based at least in part on the value, the first representation of the first driving lane;
 determining a second representation of a second driving lane, wherein the second representation is independent form the first representation; and controlling a steering system of the autonomous vehicle based at least in part on the first representation and the second representation.

7. The one or more non transitory computer readable media of claim 6, wherein determining the second representation is based at least in part on:
 determining a second value to associate with the second driving lane; and
 determining, based at least in part on the second value, the second representation of the second driving lane.

8. The one or more non transitory computer readable media of claim 6, the operations further comprising:
 determining a second value to associate with the second driving lane;
 determining, based at least in part on the second value, a third representation of the second driving lane;
 combining the first representation and the third representation into a single representation; and
 controlling the autonomous vehicle based at least in part on the single representation.

9. The one or more non transitory computer readable media of claim 6, the operations further comprising:
 determining, for a first type of metric, a first score;
 determining, for a second type of metric that is different than the first type, a second score;
 determining a second value associated with the first score and a third value associated with the second score;
 determining, based at least in part on the second value, a third representation of the first driving lane associated with the first type of metric;
 determining, based at least in part on the third value, a fourth representation of the first driving lane associated with the second type of metric, the third representation being independent from the fourth representation; and
 controlling the autonomous vehicle based at least in part on the third representation and the fourth representation.

10. The one or more non transitory computer readable media of claim 6, wherein determining the degree of overlap is based at least in part on:
 determining a distance that the path and the first driving lane overlap;
 determining, based at least in part on a position of the autonomous vehicle, a modified distance; and
 causing the modified distance to be the degree of overlap.

11. The one or more non transitory computer readable media of claim 6, wherein determining the value is based at least in part on:
 determining a cost associated with navigating the first driving lane to the destination, wherein the cost is determined based at least in part on at least one of:
  a speed limit associated with the first driving lane, or
  a distance between the autonomous vehicle and the destination.

12. The one or more non transitory computer readable media of claim 6, wherein the road segment includes multiple driving lanes, and wherein determining the value is based at least in part on:
 determining overlap values for the multiple driving lanes;
 determining, based at least in part on the overlap values, a ranking of the multiple driving lanes;
 determining, based at least in part on the ranking, a subset of the multiple driving lanes that meet or exceed a threshold; and
 determining, based at least in part on the first driving lane being in the subset, the value associated with the first driving lane.

13. The system of claim 1, wherein the road segment includes multiple driving lanes, and wherein determining the value is based at least in part on:

determining overlap values for the multiple driving lanes;

determining, based at least in part on the overlap values, a ranking of the multiple driving lanes;

determining, based at least in part on the ranking, a subset of the multiple driving lanes that meet or exceed a threshold; and determining, based at least in part on the first driving lane being in the subset, the value associated with the first driving lane.

14. A method comprising:

determining a path for an autonomous vehicle to follow to a destination;

determining a graph comprising a road segment that includes a first driving lane;

determining a degree of overlap between the path and the first driving lane;

determining, based at least in part on the degree of overlap, a value to associate with a first representation of the first driving lane;

determining, based at least in part on the value, the first representation of the first driving lane;

determining a second representation of a second driving lane, wherein the second representation is independent form the first representation; and controlling a steering system of the autonomous vehicle based at least in part on the first representation and the second representation.

15. The method of claim 14, wherein determining the second representation is based at least in part on:

determining a second value to associate with the second driving lane; and determining, based at least in part on the second value, the second representation of the second driving lane.

16. The method of claim 14, further comprising:

determining a second value to associate with the second driving lane;

determining, based at least in part on the second value, a third representation of the second driving lane;

combining the first representation and the third representation into a single representation; and controlling the autonomous vehicle based at least in part on the single representation.

17. The method of claim 14, further comprising:

determining, for a first type of metric, a first score;

determining, for a second type of metric that is different than the first type, a second score;

determining a second value associated with the first score and a third value associated with the second score;

determining, based at least in part on the second value, a third representation of the first driving lane associated with the first type of metric;

determining, based at least in part on the third value, a fourth representation of the first driving lane associated with the second type of metric, the third representation being independent from the fourth representation; and controlling the autonomous vehicle based at least in part on the third representation and the fourth representation.

18. The method of claim 14, wherein determining the degree of overlap is based at least in part on:

determining a distance that the path and the first driving lane overlap;

determining, based at least in part on a position of the autonomous vehicle, a modified distance; and causing the modified distance to be the degree of overlap.

19. The method of claim 14, wherein determining the value is based at least in part on:

determining a cost associated with navigating the first driving lane to the destination, wherein the cost is determined based at least in part on at least one of:

a speed limit associated with the first driving lane, or a distance between the autonomous vehicle and the destination.

20. The method of claim 14, wherein the road segment includes multiple driving lanes, and wherein determining the value is based at least in part on:

determining overlap values for the multiple driving lanes;

determining, based at least in part on the overlap values, a ranking of the multiple driving lanes;

determining, based at least in part on the ranking, a subset of the multiple driving lanes that meet or exceed a threshold; and determining, based at least in part on the first driving lane being in the subset, the value associated with the first driving lane.

* * * * *